US010730514B2

(12) United States Patent
Frederick et al.

(10) Patent No.: US 10,730,514 B2
(45) Date of Patent: Aug. 4, 2020

(54) SYSTEMS AND METHODS FOR EXTENDING DETACHABLE AUTOMOBILE SENSOR CAPABILITIES FOR COLLISION AVOIDANCE

(71) Applicant: Toyota Motor Engineering & Manufacturing North America, Inc., Plano, TX (US)

(72) Inventors: Scott L. Frederick, Brighton, MI (US); Scott P. Robison, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 134 days.

(21) Appl. No.: 16/128,853

(22) Filed: Sep. 12, 2018

(65) Prior Publication Data

US 2020/0079363 A1    Mar. 12, 2020

(51) Int. Cl.
*B60W 30/00*    (2006.01)
*B60W 30/09*    (2012.01)
(Continued)

(52) U.S. Cl.
CPC ............. *B60W 30/09* (2013.01); *B60R 11/04* (2013.01); *B60W 50/14* (2013.01);
(Continued)

(58) Field of Classification Search
None
See application file for complete search history.

(56) References Cited

U.S. PATENT DOCUMENTS 5,034,747 A    7/1991  Donahue
7,061,372 B2*  6/2006  Gunderson ........... G01S 13/931
                                             340/435
(Continued)

FOREIGN PATENT DOCUMENTS

EP    2007120 A1    12/2008

OTHER PUBLICATIONS

Berman, B., "Connected Bicycles Tell Cars: Don't Run Me Over," Read Write Drive (Feb. 2, 2015) (last accessed Sep. 7, 2018).
(Continued)

*Primary Examiner* — Jonathan M Dager
(74) *Attorney, Agent, or Firm* — Christopher G. Darrow; Darrow Mustafa PC

(57) ABSTRACT

Systems, methods, and other embodiments described herein relate to a manner of extending the use of originally-equipped automotive vehicle sensors to other types of transportation. In one embodiment, a method includes acquiring data from a vehicle-equipped detachable sensor about one or more object in an environment around a non-automotive entity when the vehicle-equipped detachable sensor is mounted to the non-automotive entity. The vehicle-equipped detachable sensor is capable of sensing a portion of an environment around an automotive vehicle and configured to communicate with a mobile device. The vehicle-equipped detachable sensor is also structured to be detached from the automotive vehicle and mounted to the non-automotive entity. The method includes determining, based on the acquired data, whether a detected object impinges upon a current travel trajectory of the non-automotive entity. The method also includes, in response to determining the detected object impinges upon the current travel trajectory of the non-automotive entity, outputting at least one notification signal to the mobile device.

20 Claims, 10 Drawing Sheets

(51) Int. Cl.
*B60W 50/14* (2020.01)
*G06K 9/00* (2006.01)
*B60R 11/04* (2006.01)
*G08G 1/16* (2006.01)
*B60R 11/00* (2006.01)

(52) U.S. Cl.
CPC ......... *G06K 9/00791* (2013.01); *G08G 1/166* (2013.01); *B60R 2011/0049* (2013.01); *B60W 2050/143* (2013.01)

(56) References Cited

U.S. PATENT DOCUMENTS

| | | | |
|---|---|---|---|
| 9,319,639 B1 | 4/2016 | Englander et al. | |
| 9,829,891 B2 | 11/2017 | Smith et al. | |
| 9,848,114 B2* | 12/2017 | Boudreau | H04N 5/23206 |
| 10,359,303 B1* | 7/2019 | Krishnan | G01D 11/245 |
| 2002/0158970 A1 | 10/2002 | Takeshi | |
| 2009/0134985 A1 | 5/2009 | Schmitt et al. | |
| 2009/0189981 A1 | 7/2009 | Siann et al. | |
| 2013/0038731 A1* | 2/2013 | Brey | B60R 11/04 348/148 |
| 2013/0145279 A1* | 6/2013 | Ricci | B60K 35/00 715/746 |
| 2013/0194126 A1* | 8/2013 | Paoletti | G01S 13/867 342/55 |
| 2014/0035737 A1* | 2/2014 | Rashid | B60Q 9/008 340/435 |
| 2014/0081479 A1 | 3/2014 | Vian et al. | |
| 2014/0310610 A1 | 10/2014 | Ricci | |
| 2015/0019266 A1* | 1/2015 | Stempora | G06Q 40/08 705/4 |
| 2015/0025917 A1* | 1/2015 | Stempora | G06Q 40/08 705/4 |
| 2016/0082885 A1* | 3/2016 | Rashid | B60Q 9/008 340/435 |
| 2016/0170021 A1* | 6/2016 | Rashid | G01S 13/931 342/70 |
| 2016/0363665 A1* | 12/2016 | Carlson | G01S 7/04 |
| 2017/0160392 A1* | 6/2017 | Brisimitzakis | G01S 13/931 |
| 2018/0039273 A1 | 2/2018 | Delp et al. | |
| 2018/0074518 A1 | 3/2018 | Cantrell et al. | |
| 2018/0127042 A1* | 5/2018 | Kerbel | B62J 6/04 |
| 2018/0150083 A1* | 5/2018 | Izadian | G05D 1/0255 |
| 2019/0039611 A1 | 2/2019 | Jian | H04W 4/40 |
| 2019/0111921 A1* | 4/2019 | Hehn | B60W 30/0953 |
| 2019/0361094 A1* | 11/2019 | Harris | G01S 17/87 |
| 2020/0012474 A1* | 1/2020 | Okada | H04R 1/1041 |
| 2020/0057488 A1* | 2/2020 | Johnson | G01C 21/005 |
| 2020/0082176 A1* | 3/2020 | Frederick | B60R 11/04 |
| 2020/0082612 A1* | 3/2020 | Frederick | G06T 7/20 |

OTHER PUBLICATIONS

Chen et al., "MOVESET: MOdular VEhicle SEnsor Technology," 2016 IEEE Vehicular Networking Conference (NVC) (2016) (4 pages).

* cited by examiner

SYSTEMS AND METHODS FOR EXTENDING DETACHABLE AUTOMOBILE SENSOR CAPABILITIES FOR COLLISION AVOIDANCE

TECHNICAL FIELD

The subject matter described herein relates generally to sensors used in vehicle operation and, more particularly, to detaching and mounting these sensors to other types of transportation.

BACKGROUND

Automobiles are increasingly equipped with sensors that are configured to detect information about the surrounding environment, e.g., obstacles, roadways, etc. The information may be used by automobile systems to assist a driver in avoiding collisions with the detected objects in the surrounding environment. Automobiles are parked and are sometimes underutilized for a portion of their lifespan. Current systems do not yet take advantage of otherwise idle, underutilized and in some instances, expensive sensor technology.

SUMMARY

Example systems and methods are disclosed herein that relate to a manner of extending the use of originally-equipped automobile sensors to other types of transportation. In one embodiment, a mobility system is disclosed. The mobility system includes a vehicle-equipped detachable sensor capable of sensing a portion of an environment around an automotive vehicle. The vehicle-equipped detachable sensor is configured to communicate with a mobile device, and is structured to be detached from the automotive vehicle and mounted to a non-automotive entity. The mobility system also includes one or more processors and a memory that is communicably coupled to the one or more processors. The memory stores a monitoring module including instructions that when executed by the one or more processors cause the one or more processors to acquire data from the vehicle-equipped detachable sensor about one or more objects in an environment around the non-automotive entity when the vehicle-equipped detachable sensor is mounted to the non-automotive entity. The memory also stores an impingement module including instructions that when executed by the one or more processors cause the one or more processors to determine, based on the acquired data, whether a detected object impinges upon a current travel trajectory of the non-automotive entity. Further, the memory stores a notification module including instructions that when executed by the one or more processors cause the one or more processors to, in response to determining the detected object impinges upon the current travel trajectory of the non-automotive entity, output at least one notification signal to the mobile device.

In one embodiment, a method is disclosed. The method includes acquiring data from a vehicle-equipped detachable sensor about one or more objects in an environment around a non-automotive entity when the vehicle-equipped detachable sensor is mounted to the non-automotive entity. The vehicle-equipped detachable sensor is capable of sensing a portion of an environment around an automotive vehicle and configured to communicate with a mobile device. The vehicle-equipped detachable sensor is also structured to be detached from the automotive vehicle and mounted to the non-automotive entity. The method includes determining, based on the acquired data, whether a detected object impinges upon a current travel trajectory of the non-automotive entity. The method also includes, in response to determining the detected object impinges upon the current travel trajectory of the non-automotive entity, outputting at least one notification signal to the mobile device.

In one embodiment, a non-transitory computer-readable medium is disclosed. The non-transitory computer-readable medium stores instructions that when executed by one or more processors cause the one or more processor to perform the disclosed functions. The instructions include instructions to acquire data from a vehicle-equipped detachable sensor about one or more objects in an environment around a non-automotive entity when the vehicle-equipped detachable sensor is mounted to the non-automotive entity. The vehicle-equipped detachable sensor is capable of sensing a portion of an environment around an automotive vehicle and configured to communicate with a mobile device. The vehicle-equipped detachable sensor is also structured to be detached from the automotive vehicle and mounted to the non-automotive entity. The instructions include instructions to determine, based on the acquired data, whether a detected object impinges upon a current travel trajectory of the non-automotive entity. Further, the instructions include instructions to, in response to determining the detected object impinges upon the current travel trajectory of the non-automotive entity, output at least one notification signal to the mobile device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1A:
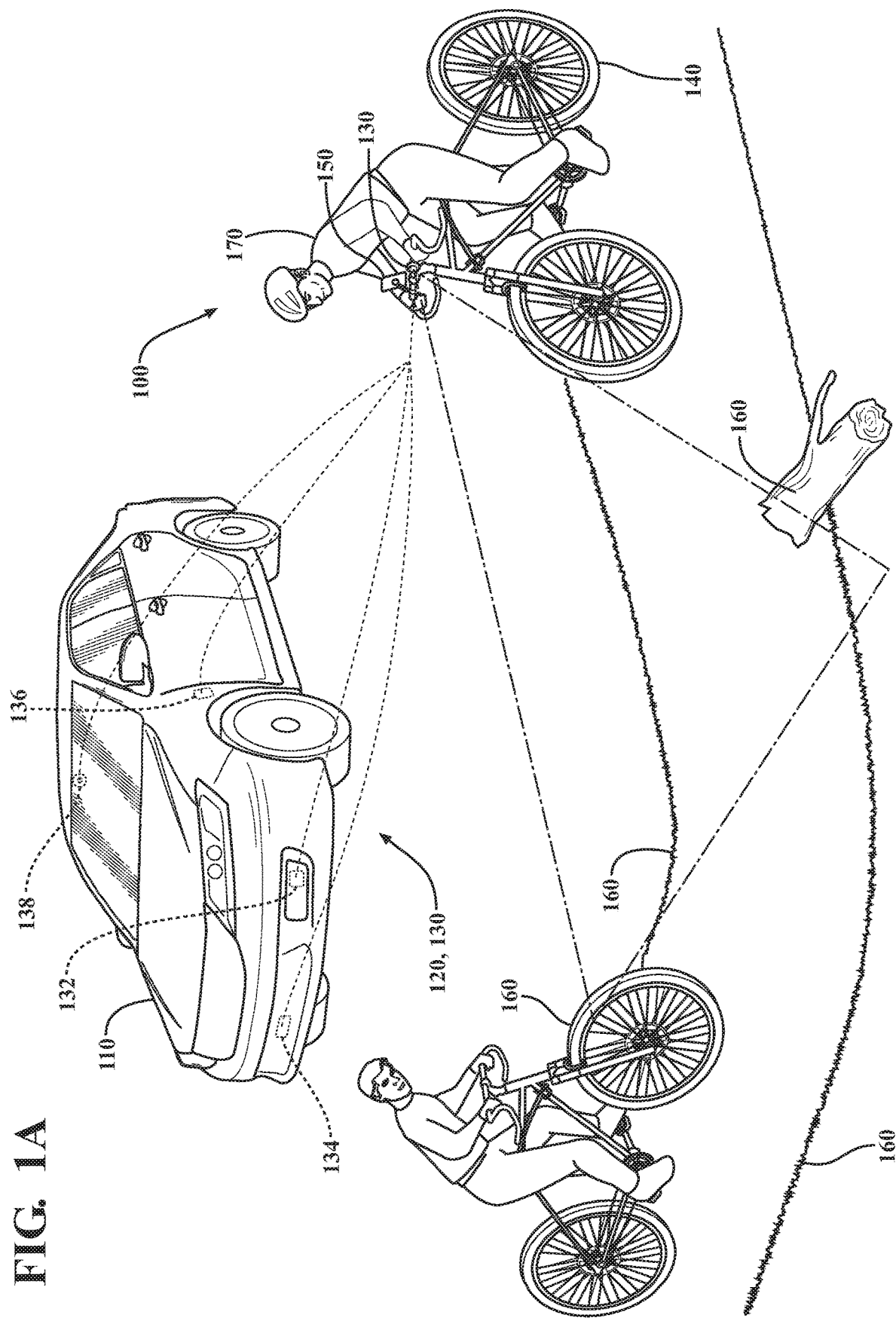
FIGS. 1A-1C illustrate perspective views of embodiments of a mobility system where a non-automotive entity receives a vehicle-equipped detachable sensor from an automotive vehicle.

Systems, methods and other embodiments associated with extending the usage of originally-equipped automotive vehicle sensors to take advantage of their rich environmental sensing capabilities are disclosed herein. Leveraging the sensor technology for use with other modes of transportation (herein referred to as "non-automotive entities") while an automotive vehicle is sitting unused, or not utilizing the detached sensor functionality, can provide operators of the non-automotive entities with increased awareness of their surroundings, which may lead to safer navigation of the surrounding environment. Furthermore, the non-automotive entity may be a user who adapts the sensor technology as a wearable device. In this case, the non-automotive entity, i.e., the wearable device user, may also benefit from the sensor functionality while wearing the originally-equipped automotive vehicle sensor.

Accordingly, in one or more embodiments, a mobility system includes an original vehicle-equipped automotive sensor that is structured to be detached from the automotive vehicle and mounted to the non-automotive entity, e.g., a bicycle, a motorcycle, an all-terrain vehicle (ATV), etc., so that the operator may benefit from the sensor capabilities while engaging with the other modes of transportation. When the non-automotive entity is the wearable device user, the vehicle-equipped automotive sensor is structured to be detached from the automotive vehicle and mounted to the wearable device user. In this case, the wearable device user may benefit from the sensor capabilities while engaging in sporting activities (e.g., running, jogging, skiing, hiking, etc.), personal activities, police matters, etc. The mobility system can then determine if an object detected from the data impinges upon a current trajectory of the non-automotive entity. Furthermore, in response to determining the object impinges upon the current travel trajectory of the non-automotive entity, the mobility system can notify the operator or wearable device user via a mobile device.

Furthermore, the non-automotive entity may include vehicle systems that control movement of the non-automotive entity, e.g., propulsion systems, braking systems, steering systems, throttle systems, etc. Accordingly, the mobility system, in one or more arrangements, can affect movement of the non-automotive entity in response to a detected object impinging upon the current travel trajectory of the non-automotive entity. That is, after determining the impingement exists, the mobility system may control the non-automotive entity by, for example, applying the brakes, actuating the steering wheel as to avoid the object, etc.

In either case, the mobility system takes advantage of temporarily unused vehicle-equipped detachable sensors and repurposes them for use with the non-automotive entity to enhance the ability of the operator or wearable device user to detect objects. In this way, the mobility system improves situational awareness by providing notification of potential collisions. In some situations, the mobility system takes control of the non-automotive entity to safely avoid objects in the surrounding environment.

Figure 1B:
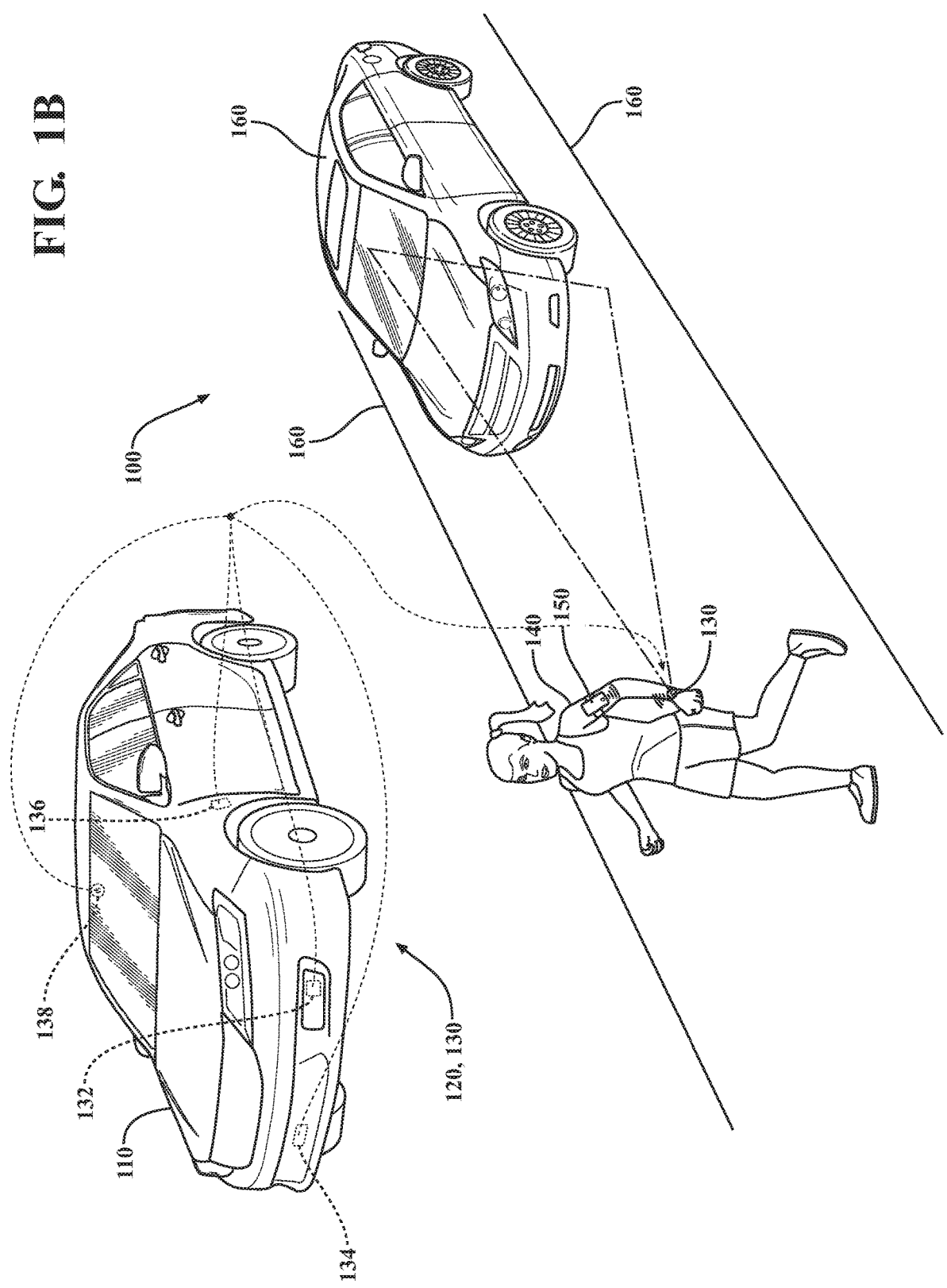
Figure 1C:
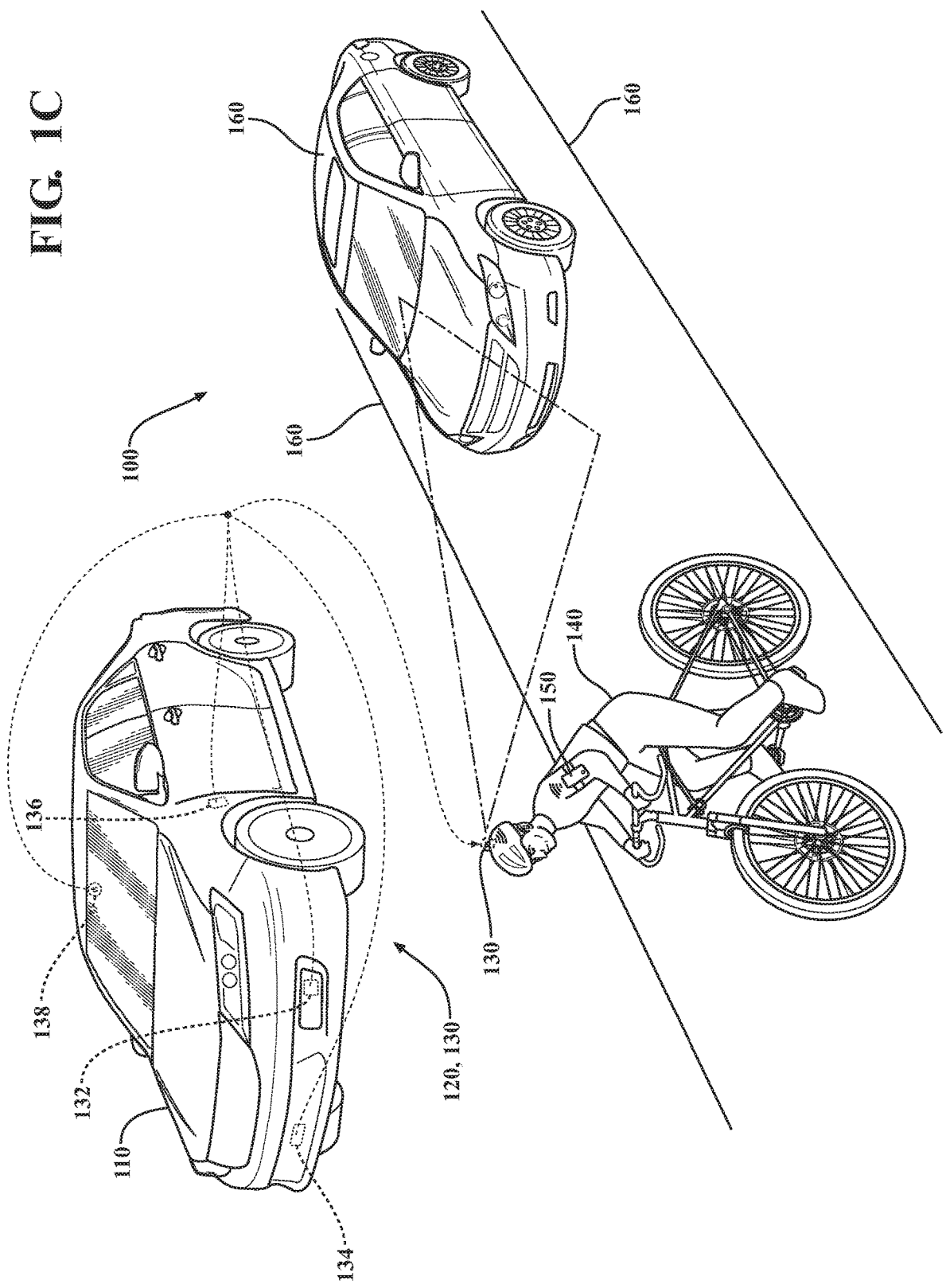

FIGS. 1A-1C are an illustrations of mobility systems 100 configured to incorporate one or more vehicle-equipped detachable sensors 130 from an automotive vehicle 110, in accordance with embodiments described herein. The mobility system 100 includes one or more vehicle-equipped detachable sensor 130, a non-automotive entity 140, and a mobile device 150. For example, FIGS. 1A-1C show the automotive vehicle 110 having a plurality of vehicle-equipped environmental sensors 120 configured as vehicle-equipped detachable sensors 130, e.g., a radar sensor 132, a LIDAR sensor 134, a sonar sensor 136 and a camera 138. The vehicle-equipped detachable sensors 130 are the vehicle-equipped environmental sensors 120 that are: structured to be detached from the automotive vehicle 110 and mounted to the non-automotive entity 140 when the automotive vehicle 110 is not in use or not taking advantage of the vehicle-equipped detachable sensor 130, capable of sensing a portion of an environment around the automotive vehicle 110 and configured to communicate with the mobile device 150.

As may be appreciated, in the context of vehicle manufacture, vehicle-equipped sensing devices may refer to those sensors assembled and installed during new automotive vehicle construction. Various vehicle-equipped sensor manufacturers may provide these devices to the specifications and requirements of the final automotive vehicle assembly, and may have a relationship with the original automotive vehicle manufacturer, and accordingly, have access to operational and/or functional specifications for device integration with the automotive vehicle 110. The vehicle-equipped sensing devices, for example, the vehicle-equipped environmental sensors 120 and the vehicle-equipped detachable sensors 130, as shown in FIGS. 1A-1C, may be part of an overall sensor system (not shown) defined for the automotive vehicle 110.

In contrast, aftermarket, third-party or non-vehicle-equipped sensing devices, are those sensing devices that may be installed as replacements for after-factory assembly. Non-vehicle-equipped manufacturers may not have access to the specifications and requirements of the original automotive vehicle manufacturer, and accordingly, non-vehicle-equipped sensing devices may not have the capacity to integrate with the sensor system of the automotive vehicle 110.

Additionally, some of the possible elements of the mobility system 100 shown in FIGS. 1A-1C will be described along with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

The mobility system 100 may acquire data from the vehicle-equipped detachable sensors 130 about one or more objects in an environment around the non-automotive entity 140 when the vehicle-equipped detachable sensors 130 are mounted to the non-automotive entity 140. Further, the mobility system 100 determines from the acquired data whether a detected object 160 of the one or more objects impinges upon a current travel trajectory of the non-automotive entity 140. Furthermore, the mobility system 100 notifies an operator 170 of the non-automotive entity 140, or in the case of a wearable device, the non-automotive entity 140 her/himself, if the object impinges upon the current travel trajectory of the non-automotive entity 140 by outputting a notification signal to the mobile device 150. The notification signal may contain information defining, e.g., messages, warnings and/or alerts.

As an example of the mobility system 100, FIG. 1A illustrates the non-automotive entity 140, for example, a bicycle, with the vehicle-equipped detachable sensor 130, e.g., the LIDAR sensor 134, mounted to the non-automotive entity 140. Further, the vehicle-equipped detachable sensor 130 is sensing one or more objects in an environment around the non-automotive entity 140, which in this case is an environment in front of the operator 170. In one arrangement, the acquired data from the vehicle-equipped detachable sensor 130 is shared wirelessly with the mobile device 150, and the mobility system 100 may notify the operator 170 of detected objects 160, for example, other moving bicycles, stationary debris on the roadway, lane markers, etc., in front of the operator 170 via a message output to the mobile device 150 if the detected objects 160 impinge upon the current travel trajectory of the non-automotive entity 140.

FIGS. 1B and 1C illustrate the non-automotive entity 140, for example a runner in FIG. 1B and a biker in FIG. 1C, adapting the vehicle-equipped detachable sensor 130, e.g. the radar sensor 132, as a wearable device. The vehicle-equipped detachable sensor 130 is sensing an environment around the runner and the biker, more specifically, the environment behind the runner and the biker. The mobility system 100 may notify the runner and the biker if the detected objects 160, for example, the vehicle coming up behind them, impinges upon their current travel trajectory.

Figure 2:
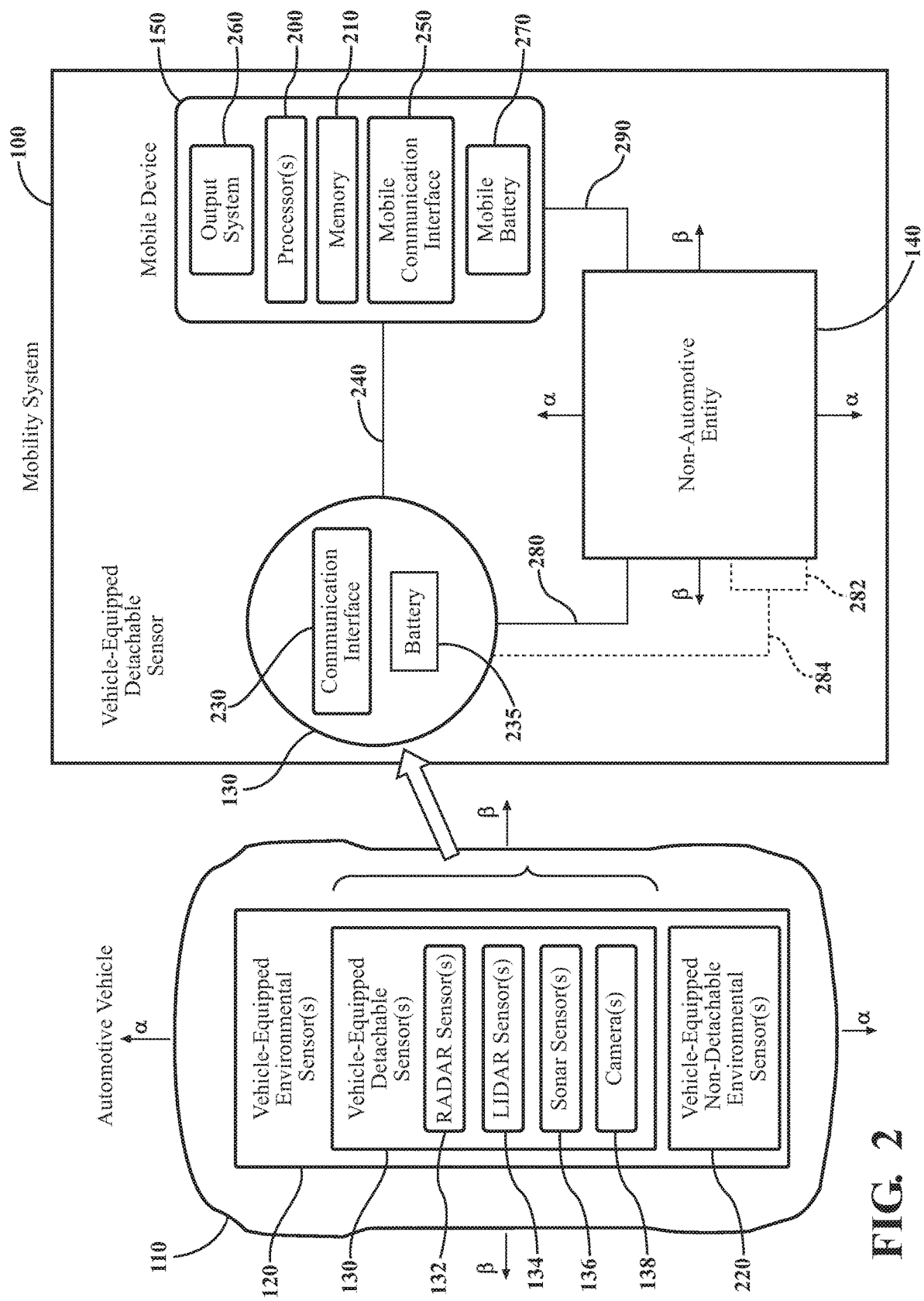
FIG. 2 is a block diagram of FIGS. 1A-1C illustrating the vehicle-equipped detachable sensor and a mobile device both mounted to the non-automotive entity.

FIG. 2 is a block diagram of the automotive vehicle 110 and the mobility system 100 of FIGS. 1A-1C. The automotive vehicle 110 may be any form of motorized, electrical or hybrid transport, e.g., a car, truck, SUV, etc., that incorporates at least one vehicle-equipped environmental sensor 120 configured as the vehicle-equipped detachable sensor 130. It should be appreciated that not all the various elements required for operation of the automotive vehicle 110 are shown in FIG. 2. Only the elements of the automotive vehicle 110 that are pertinent to the various embodiments of the mobility system 100 will be discussed herein.

The automotive vehicle 110 may include the one or more vehicle-equipped environmental sensors 120. The vehicle-equipped environmental sensors 120 are configured to acquire, and/or sense driving environment data. "Driving environment data" includes data or information about the external environment in which the automotive vehicle 110 is located or one or more portions thereof. In one or more arrangements, the vehicle-equipped environmental sensors 120 can be configured to monitor in real-time. As used herein, the term "real-time" means a level of processing responsiveness that a system senses as sufficiently immediate for a particular process or determination to be made, or that enables a processor to keep up with some external process. It will be understood that in various embodiments of the mobility system 100, it may not be necessary for the automotive vehicle 110 to have all of the vehicle-equipped environmental sensors 120 shown in FIG. 2.

The automotive vehicle 110 may include the one or more vehicle-equipped environmental sensors 120 that can be detached from automotive vehicle 110 (hereinafter referred to as "vehicle-equipped detachable sensors 130"). As shown in FIG. 2, for example, the vehicle-equipped detachable sensors 130 can include one or more radar sensors 132, one or more LIDAR sensors 134, one or more sonar sensors 136, and one or more cameras 138. Further, the automotive vehicle 110 can have additional sensors, including additional vehicle-equipped environmental sensors 120 configured as vehicle-equipped detachable sensors 130 now known or later developed, to those shown in FIG. 2, and it will be understood that the embodiments of the mobility system 100 are not limited to the particular vehicle-equipped detachable sensors 130 described herein. Furthermore, the vehicle-equipped detachable sensors 130 can be mounted internally within or mounted externally to the automotive vehicle 110.

The automotive vehicle 110 may include vehicle-equipped non-detachable environmental sensors 220 that are not configured as vehicle-equipped detachable sensors 130. An example of the vehicle-equipped non-detachable environmental sensors 220 may be the vehicle-equipped environmental sensors 120 that are not structured to be detached from the automotive vehicle 110, e.g., cameras, LIDAR sensors, radar sensors, and/or sonar sensors. In other words, not all of the vehicle-equipped environmental sensors 120 may be configured as vehicle-equipped detachable sensors 130.

The non-automotive entities 140 of FIGS. 1A-1C and 2 are any form of transport, for example, non-motorized, motorized, electric, hybrid, etc., all of which are not automotive vehicles, that may benefit from the additional capabilities realized by the mobility system 100, i.e., environmental object detection around the non-automotive entity 140 and associated notification as a result of the detected objects 160 impinging upon the current travel trajectory of the non-automotive entity 140. For example, different types of non-automotive entities 140 may include, e.g., bicycles, tricycles, tandem bicycles, wheelchairs, skateboards, scooters, motorcycles, ATVs, boats, jet skis, three or more wheeled motorized vehicles, snowmobiles, Segways, golf carts, wagons, etc. As set forth above, the non-automotive entity 140 may be a user that adapts the vehicle-equipped detachable sensor 130 as a wearable device. The non-automotive entity 140 may include other vehicle-equipped sensors that are not structured to be detached and mounted elsewhere (not shown), e.g., cameras, radar sensors, etc.

The vehicle-equipped detachable sensors 130 may not be required for operation of the automotive vehicle 110. However, the vehicle-equipped detachable sensors 130 may be required for proper operation. For example, the automotive vehicle 110 operation may be impaired without the vehicle-equipped detachable sensors 130 installed. In some cases, the automotive vehicle 110 may not operate unless the vehicle-equipped detachable sensors 130 are reattached to the automotive vehicle 110 and functioning properly. Each of the vehicle-equipped detachable sensors 130 described herein are structured to be detached from the automotive vehicle 110 and mounted to the non-automotive entity 140 when the automotive vehicle 110 is not in use or not utilizing the vehicle-equipped detachable sensor 130 functionality. Typically, the differences between the vehicle-equipped detachable sensor 130 and the comparable vehicle-equipped non-detachable environmental sensor 220 are, for example, the mechanical ability of the vehicle-equipped detachable sensor 130 to be detached from the automotive vehicle 110 and the ability of the vehicle-equipped detachable sensor 130 to communicate with the mobile device 150. Otherwise, the two comparable sensors 130, 220 can function identically for their intended purposes.

In one or more arrangements, the vehicle-equipped detachable sensors 130 can include the one or more radar sensors 132. The radar sensors 132 can be any device, component and/or system that can detect a dynamic and/or stationary object using at least in part radio signals. The radar sensors 132 can be configured to detect the presence of one or more objects in a portion of the environment around the automotive vehicle 110, the position of each detected object 160 relative to the automotive vehicle 110, the distance between each detected object 160 and the automotive vehicle 110 in one or more directions (e.g. in a longitudinal direction α of the automotive vehicle 110, a lateral direction (3 of the automotive vehicle 110, as shown in FIG. 2, and/or other directions), the elevation of each detected object 160, the speed of each detected object 160, and/or the movement of each detected object 160. The radar sensors 132, or data obtained thereby, can determine or be used to determine the speed, position, and/or orientation of detected objects 160 in the environment around the automotive vehicle 110. The radar sensors 132 can have three dimensional coordinate data associated with the detected objects 160.

In one or more arrangements, the vehicle-equipped detachable sensors 130 can include the one or more LIDAR sensors 134. The LIDAR sensors 134 can be any device, component and/or system that can detect a dynamic and/or stationary object using at least in part electromagnetic signals. In one or more arrangements, the electromagnetic signals can be laser signals. The LIDAR sensors 134 can include a laser source and/or laser scanner configured to emit a laser signal and a detector configured to detect reflections of the laser signal. The LIDAR sensors 134 may be configured to operate in a coherent or an incoherent detection mode.

The LIDAR sensors 134 can be configured to detect the presence of one or more objects in a portion of the environment around the automotive vehicle 110, the position of each detected object 160 relative to the automotive vehicle 110, the distance between each detected object 160 and the automotive vehicle 110 in one or more directions, the elevation of each detected object 160, the speed of each detected object 160, and/or the movement of each detected object 160.

In one or more arrangements, the vehicle-equipped detachable sensors 130 can include the one or more sonar sensors 136. The sonar sensors 136 can be any device, component and/or system that can detect a dynamic and/or stationary object using at least in part sound signals. For example, the sonar sensor 136 actively sends out a high-frequency sound pulse and then determines the time for the echo of the sound to reflect back. The sonar sensors 136 can be configured to detect multiple objects in a portion of the environment around the automotive vehicle 110, the position of each detected object 160 relative to the automotive vehicle 110, the distance between each detected object 160 and the automotive vehicle 110 in one or more directions, the speed of each detected object 160, and/or the movement of each detected object 160.

In one or more arrangements, the vehicle-equipped detachable sensors 130 can include the one or more cameras 138. The cameras 138 can be any device, component, and/or system that can capture visual data. The visual data can include video and/or image information/data. The visual data can be in any suitable form. In one or more arrangements, visual data can include heat signatures, thermal images, and/or thermal video of a portion of the environment around the automotive vehicle 110. The cameras 138 can be configured to detect multiple objects relative to the automotive vehicle 110. The cameras 138 may be arranged to determine a distance of each detected object 160 relative to the automotive vehicle 110 by, e.g., by a processor using triangle similarity techniques in conjunction with pixel measurements of a captured image. The cameras 138 may also be arranged to determine a speed of the detected object 160, e.g., by a processor tracking the determined distance over time.

The cameras 138 can be any suitable type of camera. For instance, the cameras 138 can be high resolution cameras, high dynamic range (HDR) cameras, infrared (IR) cameras, and/or thermal imaging cameras.

The vehicle-equipped detachable sensor 130 includes a communication interface 230 configured to communicate with the mobile device 150. In other words, the vehicle-equipped detachable sensor 130 is configured to wirelessly communicate with the mobile device 150. The communication interface 230 may be configured for wired and/or wireless communication with the mobile device 150 via a first link 240 and may be implemented via any number of communication protocols such as Ethernet, the Controller Area Network (CAN) protocol, Wi-Fi, the Local Interconnect Network (LIN) protocol, Bluetooth®, Bluetooth® Low Energy, the Universal Serial Bus (USB) protocol etc.

In one or more arrangements, the vehicle-equipped detachable sensor 130 may include a battery 235 to power components of the vehicle-equipped detachable sensor 130. The battery 235 may be a rechargeable lithium-ion battery, or the like. In other arrangements, the vehicle-equipped detachable sensor 130 may not include the battery 235 and receive power from a mobile battery 270 of the mobile device 150 via the first link 240, as set forth below.

The mobile device 150 includes devices that are configured to communicate with the vehicle-equipped detachable sensor 130 in a wired and/or wireless fashion, as set forth below. The mobile device 150 may be mounted to the non-automotive entity 140, as shown in FIGS. 1A-1C, or carried by the operator 170 of the non-automotive entity 140. The mobile device 150 may be, for example, a smart phone, a tablet, phablets, etc., or any other mobile device 150 that may be mounted to the non-automotive entity 140 and/or be able to be carried by the operator 170. The mobile device 150 may be, e.g., a smart display, that is configured to communicate with the vehicle-equipped detachable sensors 130 and mount to the non-automotive entity 140. Alternatively or in addition, the mobile device 150 may be an existing, e.g., integrated, display of the non-automotive entity 140 that is configured to communicate with the vehicle-equipped detachable sensors 130. For example, the existing display of the non-automotive entity 140 may pair, e.g., wirelessly connect via Bluetooth technology, with the vehicle-equipped detachable sensor 130 via the communications interface 230.

The components of the mobile device 150, in one embodiment, include a mobile communication interface 250, an output system 260, the mobile battery 270, one or more processors 200 and a memory 210. The processor(s) 200 and the memory 210 will be discussed in greater detail below.

The mobile communication interface 250 facilitates wired or wireless communication between the components of the mobile device 150 and the vehicle-equipped detachable sensors 130. In one embodiment, the mobile communication interface 250 facilitates wired or wireless communication between components of the mobile device 150 and the non-automotive entity 140, as described further below. The mobile communication interface 250 may be programmed to communicate in accordance with any number of wired or wireless communication protocols. For instance, the mobile communication interface 250 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, Wi-Fi, the Local Interconnect Network (LIN) protocol, the Universal Serial Bus (USB) protocol, etc. As discussed in greater detail below, in one embodiment, the mobile communication interface 250 receives data from the vehicle-equipped detachable sensors 130 and passes that data to the processor(s) 200, stores that data in the memory 210, or both.

The output system 260 of the mobile device 150 is operatively connected to the processor(s) 200 of the mobile device 150. The output system 260 includes any device, component, or arrangement or groups thereof that enable information/data to be presented to the operator 170 or the non-automotive entity 140, i.e., the wearable device user. For example, the output system 260 may include a mobile display, mobile speakers, haptic vibration motors, a light emitting diode (LED) flash, etc. As use herein, operatively connected can include direct or indirect connections, including connections without direct physical contact.

The mobile battery 270 provides power to one or more components of the mobile device 150. The mobile battery 270 may be a rechargeable lithium-ion battery, or the like. In one embodiment, the mobile battery 270 supplies power via one or more wires to the vehicle-equipped detachable sensors 130 via the first link 240, as set forth above. 2. In yet another arrangement, the vehicle-equipped detachable sensor 130 may include the battery 235 and the mobile device 150 may include the mobile battery 270. In this case, either battery 235, 270 may recharge the other.

The mobility system 100 includes a second link 280 between the vehicle-equipped detachable sensor 130 and the non-automotive entity 140 for each vehicle-equipped detachable sensor 130 of the mobility system 100. The second link 280 may include, for example, a mechanical device that mounts the vehicle-equipped detachable sensor 130 to the non-automotive entity 140, e.g., straps, fasteners, zip-ties and/or Velcro®, etc. The second link 280 may include, for example, a mechanical device that receives the vehicle-equipped detachable sensor 130 and directly mounts it to the non-automotive entity 140. That is, the second link 280 may be a mechanical device that adapts the vehicle-equipped detachable sensor 130 as a wearable device so that the non-automotive entity 140 may wear the vehicle-equipped detachable sensor 130. The mechanical device of the second link 280 may be, for example, a belt having compartments to receive the vehicle-equipped detachable sensor 130, pockets that may receive the vehicle-equipped detachable sensor 130, hooks attached to clothing of the non-automotive entity 140 to receive the vehicle-equipped detachable sensor 130, etc. As set forth below, the one or more second links 280 may include a wired or wireless link that facilitates communication between the communication interface 230 of the vehicle-equipped detachable sensors 130 and the non-automotive entity 140.

In one or more arrangements, the vehicle-equipped detachable sensor 130 may be mounted to the non-automotive entity 140 indirectly. That is, the mobility system 100 may include an intermediate device 282 and an intermediate mechanical link 284 both of which are between the non-automotive entity 140 and the vehicle-equipped detachable sensor 130, as shown in hidden lines in FIG. 2. In this case, the vehicle-equipped detachable sensor 130 is mounted to the intermediate device 282 via the intermediate mechanical link 284 and the intermediate device 282 is directly mounted to the non-automotive entity 140. For example, the intermediate device 282 may be a helmet that is mounted directly to the head of the non-automotive entity 140, as shown in FIG. 1C, a gun that is held directly by hands of the non-automotive entity 140, skis that extend directly from feet of the non-automotive entity 140, a backpack that protrudes directly from a back of the non-automotive entity 140, etc. The intermediate mechanical link 284 may be any suitable fastening device, e.g., clips, ties, bands, etc. Further, for the case where the mobility system 100 includes one or more vehicle-equipped detachable sensors 130, the mobility system 100 may include the second link 280 directly mounting the one or more vehicle-equipped detachable sensors 130 to the non-automotive entity 140, the intermediate mechanical link 284 indirectly mounting the one or more vehicle-equipped detachable sensors 130 to the non-automotive entity 140 or both.

The mobility system 100, in one arrangement, includes a third link 290 between the mobility device 150 and the non-automotive entity 140. The third link 290 may include a mechanical device that receives the mobile device 150 and directly mounts it to the non-automotive entity 140. The mechanical device of the third link 290 may be, for example, a pocket attached to the non-automotive entity 140 that may receive the mobile device, a Velcro strap that is attached to the mobile device 150 and an arm of the non-automotive entity 140, as shown in FIGS. 1B and 1C, etc. In another arrangement, the third link 290 may simply be a hand of the non-automotive entity 140 that carries the mobile device 150, which acts as a direct method of mounting the mobile device 150 to the non-automotive entity 140. In another arrangement, the mobile device 150 may be indirectly mounted to the non-automotive entity 140 via an intermediate mechanical link 284 between the mobile device 150 and an intermediate device 282 that is mounted to the non-automotive entity 140 (not shown). In yet another arrangement, as set forth below, the third link 290 may include, for example, a wired and/or wireless communication link between the mobile communication interface 250 of the mobile device 150 and the non-automotive entity 140.

The second and third links 280, 290 may include, for example, one or more connectors (not shown) that electrically couple and mechanically mount both the vehicle-equipped detachable sensor 130 and the mobile device 150 to the non-automotive entity 140. For example, the second and third links 280, 290 may be one or more sockets (not shown) that receive and mechanically mount the vehicle-equipped detachable sensor 130 and the mobile device 150 to the non-automotive entity 140 while providing, e.g., a wired interface that facilitates electrical communications between the vehicle-equipped detachable sensor 130 and the mobile device 150, i.e., incorporates the first link 240.

The vehicle-equipped detachable sensors 130 are structured to be detached from the automotive vehicle 110 and mounted to the non-automotive entity 140 when the automotive vehicle 110 is not in use or not utilizing the vehicle-equipped detachable sensor 130 functionality. Accordingly, the vehicle-equipped detachable sensors 130 are structured such that they may be man-portable, i.e., the vehicle-equipped detachable sensors 130 may be extracted from, e.g., a housing cavity, by a single human user and may be carried by a single human user without assistance of devices. The vehicle-equipped detachable sensors 130 are also structured to be mounted to the non-automotive entity 140. For example, the vehicle-equipped detachable sensors 130, once removed from the automotive vehicle 110, are of reasonable size and weight to mount to the various types of non-automotive entities 140, e.g., the size of a deck of cards and weighing less than one kilogram, etc.

In arrangements in which the mobility system 100 includes a plurality of vehicle-equipped detachable sensors 130, the plurality of vehicle-equipped detachable sensors 130 can be distributed about the non-automotive entity 140 in any suitable manner. The vehicle-equipped detachable sensors 130 can work independently from each other or in combination with each other. In such case, the two or more vehicle-equipped detachable sensors 130 can form a sensor network.

The vehicle-equipped detachable sensors 130, which are configured to acquire and/or sense driving environment data as set forth above, are also configured to acquire and/or sense driving environment data around the environment of the non-automotive entity 140 or portions thereof when the vehicle-equipped detachable sensors 130 are mounted to the non-automotive entity 140. For instance, the vehicle-equipped detachable sensors 130 can be configured to acquire data of at least a forward portion and/or at least a rearward portion of the environment around the non-automotive entity 140. For example, the vehicle-equipped detachable sensors 130 can monitor a forward portion along a longitudinal direction α of the non-automotive entity 140 in front of the non-automotive entity 140, and/or monitor the rearward portion along the longitudinal direction α of the non-automotive entity 140 behind the non-automotive entity 140, as shown in FIG. 2.

Additionally or alternatively, the vehicle-equipped detachable sensors 130 can be configured to acquire data of at least a side portion of the environment around the non-automotive entity 140 when the vehicle-equipped detachable sensors 130 are mounted to the non-automotive entity 140. The side portion can be, for example, a portion of the environment that is located between the forward portion and the rearward portion of the non-automotive entity 140. For example, the vehicle-equipped detachable sensors 130 can be configured to monitor a left side and/or a right side portion along a lateral direction θ of the non-automotive entity 140, as shown in FIG. 2.

In either case, the mobility system 100 is implemented to perform methods and functions as disclosed herein relating to extending the use of temporarily idle vehicle-equipped detachable sensors 130 to acquire data about one or more objects in an environment around a non-automotive entity 140 and provide notification, and in some embodiments, controllability of the non-automotive entity 140 when detected objects 160 impinge the current travel trajectory of the non-automotive entity 140. The noted functions and methods will become more apparent with a further discussion of the figures.

Figure 3:
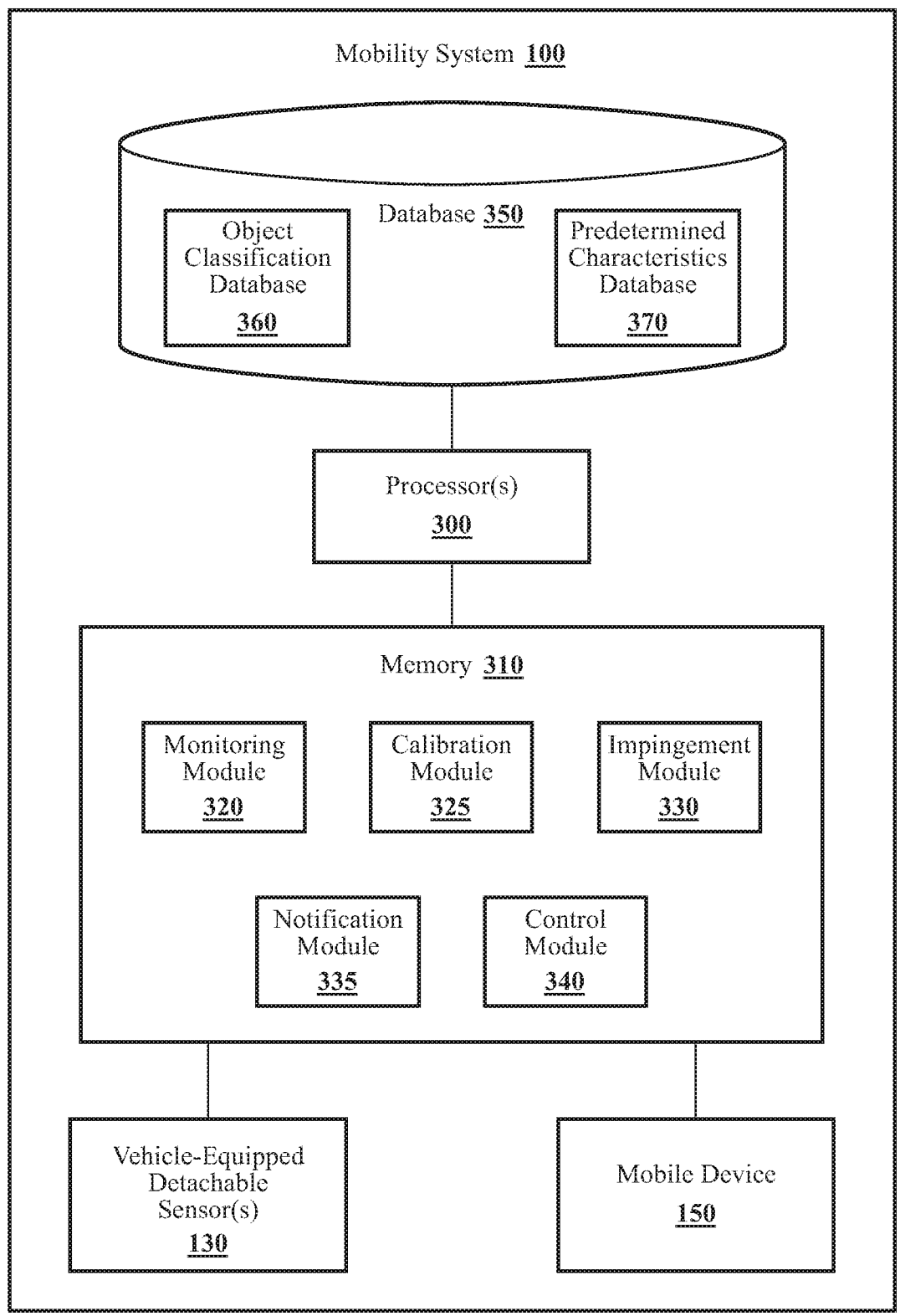
FIG. 3 illustrates one embodiment of a mobility system that is associated with extending the use of the vehicle-equipped detachable sensor to the non-automotive entity.

FIG. 3 illustrates one embodiment of the mobility system 100 of FIGS. 1A-1C and 2 that provides the benefit of environmental object detection, notification, and in one or more arrangements, control for a type of non-automotive entity 140, e.g., a bicycle, motorcycle, ATV, a wearable device user, etc. The mobility system 100 can include one or more processors 300. The processor(s) 300 can be any component or group of components that are configured to execute any of the processes described herein or any form of instructions to carry out such processes or cause such processes to be performed. Examples of suitable processor(s) 300 can include microprocessors, microcontrollers, digital signal processors, and other circuitry that can execute software. Further examples of suitable processor(s) 300 include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 300 can include at least one hardware circuit (e.g., an integrated circuit) configured to carry out instructions contained in program code. In arrangements in which there is a plurality of processors 300, such processors can work independently from each other or one or more processors can work in combination with each other.

The mobility system 100 can include a computer readable medium. In one or more arrangements, the computer readable medium can be a memory 310. Additionally, in one embodiment, the memory 310 stores a monitoring module 320, a calibration module 325, an impingement module 330, a notification module 335, and a control module 340. The memory 310 is a random-access memory (RAM), read-only memory (ROM), a hard-disk drive, an external hard-disk drive, a flash memory, or other suitable memory for storing the modules 320, 325, 330, 335, and 340. The modules 320, 325, 330, 335, and 340 are, for example, computer-readable instructions that when executed by the processor(s) 300 cause the processor(s) 300 to perform the various functions of the mobility system 100 disclosed herein. In one or more arrangements, the memory 310 can be a component of the processor(s) 300. In one or more arrangements, the memory 310 can be operatively connected to the processor(s) 300 and used thereby.

In one or more arrangements, the vehicle-equipped detachable sensors 130 may include the one or more of the processors 300 and/or the memory 310. That is, the vehicle-equipped detachable sensors 130 may be considered "smart sensors." The processor(s) 300 and the memory 310 of the mobility system 100 may be completely contained within the vehicle-equipped detachable sensors 130, the mobile device 150 or be distributed among the mobile device 150 and vehicle-equipped detachable sensors 130. The processor(s) 200 and the memory 210 may be a part of the mobility system 100, the mobility system 100 may include separate processor(s) and memory from the processors(s) 200 and the memory 210, or the mobility system 100 may access the processor(s) 200 and the memory 210 through a data bus or another communications path. As an example of a distributed mobility system 100, the vehicle-equipped detachable sensor 130 may include one of the processor(s) 300 and the memory 310 executing and storing the monitoring module 320, respectively and the mobile device 150 may include one of the processor(s) 300 and the memory 310 executing and storing the impingement module 330 and the notification module 335, respectively.

In either case, in one or more arrangements of the mobility system 100, the vehicle-equipped detachable sensors 130 may include at least one of the one or more processors 300 and the memory 310 and the mobile device 150 may include at least one of the one or more processors 300 and the memory 310. The processor(s) 200 and the processor(s) 300, may be operatively connected to each other and may process any portion of the modules 320, 325, 330, 335, and 340 in any combination. The memory 210 and the memory 310 may be operatively connected to each other and may store any portion of the modules 320, 325, 330, 335, and 340 in any combination.

With continued reference to FIG. 3, in one embodiment, the monitoring module 320 includes instructions that function to control the processor(s) 300 to acquire data from vehicle-equipped detachable sensors 130 about one or more objects in the environment around the non-automotive entity 140 when the vehicle-equipped detachable sensors 130 are mounted to the non-automotive entity 140. The data may be of the form, e.g., image data from the cameras 138, three-dimensional reflective data (from, e.g., the radar sensors 132, the LIDAR sensors 134, the sonar sensors 136), etc. Specifically, the monitoring module 320 collects data acquired from the vehicle-equipped detachable sensors 130 and stores the data in a database 350.

The monitoring module 320, in one or more arrangements, configures the vehicle-equipped detachable sensors 130 to detect objects associated with the acquired data in the environment around the non-automotive entity 140. Detecting objects can include, for example, determining, assessing, monitoring, measuring, quantifying and/or sensing, directly or indirectly, the presence of one or more dynamic and/or stationary objects in the environment around the non-automotive entity 140. Additionally, the monitoring module 320 can determine if the detected object 160 is small enough such that its presence in the environment around the non-automotive entity 140 is insignificant and may disregard the detected object 160.

The calibration module 325, in one embodiment, includes instructions that function to control the processor(s) 300 to calibrate the vehicle-equipped detachable sensor 130 once mounted on the non-automotive entity 140. Typically, when the vehicle-equipped detachable sensor 130 is detached from the automotive vehicle 110 and mounted to the non-automotive entity 140, the vehicle-equipped detachable sensor 130 may require calibration. That is, the vehicle-equipped detachable sensor 130 may need to be configured to a mounting location on the non-automotive entity 140 so that the acquired data from the monitoring module 320 is representative of the environment around the non-automotive entity 140.

In one embodiment, the calibration module 325 calibrates the vehicle-equipped detachable sensor 130 to the mounting location on the non-automotive entity 140 by accessing and using acquired data from the monitoring module 320 and mounting location parameters associated with the mounting location of the vehicle-equipped detachable sensor 130 on the non-automotive entity 140. For example, the calibration module 325 may require values of parameters for, e.g., a measured height at which the vehicle-equipped detachable sensor 130 is mounted with respect to the ground, a measured distance a known object is from the vehicle-equipped detachable sensor 130 once mounted on the non-automotive entity 140, etc. The calibration module 325 may receive values of the mounting location parameters from, e.g., the operator 170 entering the value into the mobile device 150 (e.g., a calibration application running on the mobile device 150), etc. Thus, the calibration module 325, in one arrangement, calibrates the vehicle-equipped detachable sensor 130 to a portion of the environment around the non-automotive entity 140 based at least in part on mounting location parameters associated with the mounting location of the vehicle-equipped detachable sensor 130 on the non-automotive entity 140.

In one arrangement, the calibration module 325 may determine the measured height and the measured distance directly, as is known. In other words, the vehicle-equipped detachable sensor 130 may be capable of automatic calibration. In this instance, the calibration module 325 includes instructions that function to control the processor(s) 300 to access other sensing components of the mobile device 150 (not shown) to assist in providing the necessary values of the mounting location parameters to the calibration module 325, e.g., the mounting height, the measured distance, the orientation of the vehicle-equipped detachable sensor 130 with respect to the non-automotive entity 140, etc. The calibration module 325 may require any suitable type of mounting location parameters to calibrate the vehicle-equipped detachable sensor 130 to the mounting location on the non-automotive entity 140, e.g., a mounting angle from the longitudinal direction α of the non-automotive entity 140, a mounting angle from the lateral direction θ of the non-automotive entity 140, a mounting angle from ground, etc. Further, the calibration module 325 may access and use acquired data from the monitoring module 320, and/or request that the monitoring module 320 acquire new data, e.g., when the measured distance of the known object has changed, when the vehicle-equipped detachable sensor 130 needs to be re-calibrated as determined by the calibration module 325, the operator 170 or the non-automotive entity, i.e., the wearable device user, etc.

The calibration module 325 may store a calibration that includes the mounting location parameters in the memory 210 of the mobile device 150 and/or the memory 310 of the vehicle-equipped detachable sensor 130, if the vehicle-equipped detachable sensor 130 is so equipped. The calibration may be indexed by, e.g., a sensor type, a mounting location, a calibration date, etc., so that calibration module 325 can retrieve and use the calibration in lieu of re-calibrating the same vehicle-equipped detachable sensor 130 to the same mounting location.

Alternatively, the vehicle-equipped detachable sensor 130 may not need calibration if it is utilized in a specific manner. For example, the vehicle-equipped detachable sensor 130 may not require calibration if it is mounted on the non-automotive entity 140 at a certain height from the ground. As another example, the vehicle-equipped detachable sensor 130 may not require calibration if it is being used to sense objects that are within a specified distance from the from the vehicle-equipped detachable sensor 130, e.g., 20 meters, etc.

The impingement module 330, in one embodiment, includes instructions that function to control the processor(s) 300 to determine, based on the acquired data from the vehicle-equipped detachable sensor 130, whether the detected object 160 impinges upon the current travel trajectory of the non-automotive entity 140. In one or more arrangements, the impingement module 330 predicts a trajectory of the detected object 160 and determines whether the predicted trajectory of the detected object 160 impinges upon the current travel trajectory of the non-automotive entity 140.

Specifically in one arrangement, the impingement module 330 may determine an impingement, in the extreme, as a potential collision between the detected object 160 and the non-automotive entity 140 at some future time. The impingement module 330 may not only base the determination of the potential collision on the predicted trajectory of the detected object 160 and the current travel trajectory of the non-automotive entity 140, but on other factors, such as the predicted trajectory of the non-automotive entity 140, the relative location of the detected object 160 to the non-automotive entity 140, the past, present and predicted speeds and/or accelerations/decelerations of the detected object 160 and the non-automotive entity 140, the past, present and predicted locations of the detected object 160 and the non-automotive entity 140, etc. Alternatively, the impingement module 330 may determine, in one or more arrangements, that an impingement is not a physical collision itself, but an encroachment or penetration to within a predetermined distance that surrounds the non-automotive entity 140. The predetermined distance can be any suitable value, including, for example, about 20 feet or less, about 15 feet or less, about 10 feet or less, about 5 feet or less, about 4 feet or less, about 3 feet or less, about 2 feet or less or about 1 foot or less.

It should be appreciated that the one or more detected objects 160 may be stationary, and as such, the impingement module 330, in one arrangement, can determine whether the stationary detected object 160 would impinge upon the current travel trajectory of the non-automotive entity 140. In other words, the impingement module 330 may determine whether the current travel trajectory of the non-automotive entity 140 in conjunction with the other the factors set forth above is at risk of collision or at risk of coming to within the predetermined distance of the stationary detected object 160.

Alternatively or additionally, in another arrangement, the impingement module 330 can determine that the detected object 160 is within the predetermined distance of the non-automotive entity 140, but not currently impinging upon the non-automotive entity 140. As an example, the impingement module 330 may have determined in the past that the predicted trajectory of the detected object 160 would impinge on the non-automotive entity 140, i.e. the detected object 160 was on a collision course with the current travel trajectory of the non-automotive entity 140, but the detected object 160 may have changed course such that the risk of collision is removed, however the detected object 160 may currently be within the predetermined distance of the non-automotive entity 140.

In yet another alternative arrangement, the impingement module 330 can determine whether the predicted trajectory of the detected object 160 would impinge upon the current travel trajectory of the non-automotive entity 140 when the non-automotive entity 140 is stationary. In other words, the impingement module 330 can determine whether the predicted travel trajectory of the detected object 160 in conjunction with the other factor set forth above is at risk of collision or at risk of coming to within the predetermined distance of the non-automotive entity 140 that is stationary.

The impingement module 330 may receive a value of the predetermined distance from a lookup table stored in the database 350 or from, e.g., the operator 170 entering the value into the mobile device 150 (e.g., an application running on the mobile device 150), etc.

The impingement module 330 may determine the current and predicted travel trajectories of the non-automotive entity 140 in any suitable manner. For example, the impingement module 330 may access acquired data in the database 350 and determine the current travel trajectory from the instant direction, acceleration/deceleration and velocity of the non-automotive entity 140. The predicted trajectory of the non-automotive entity 140 may, for example, be based on the continuation of the current direction and movement of the non-automotive entity 140. The non-automotive entity 140 may have suddenly changed course, and the predicted travel trajectory may be based on the continuation and the new direction and movement of the non-automotive entity 140. Direction and movement parameters may be determined by the impingement module 330 from any type of environmental or contextual information collected by the vehicle-equipped detachable sensors 130. For example, the current trajectory, predicted trajectory, speed, etc., of the non-automotive entity 140 may be determined from the vehicle-equipped detachable sensors 130 (e.g., the LIDAR sensor 134), or by the impingement module 330 comparing changes in distance data to a detected stationary detected object 160 over time from the camera 138 images. As another example, the impingement module 330 may determine the current and predicted trajectories of the non-automotive entity 140 based on the data received from the navigation unit of the mobile device 150.

The impingement module 330 may determine the predicted trajectory of the one or more detected objects 160 directly from the acquired data. The impingement module 330, in one arrangement may simply predict the future trajectory (if any) of the detected object 160 based solely on the instant direction, acceleration/deceleration and velocity of each of the detected objects 160. In other words, the predicted trajectory of the detected object 160 is based on the continuation of the current direction and movement of the detected object 160. The projected trajectory of the detected object 160 may be characterized in any suitable manner based on the acquired data. Additionally, the current movement of the detected object 160 may be determined directly from the vehicle-equipped detachable sensor 130 (e.g., the radar sensor 132) or by the impingement module 330 based on information provided by the vehicle-equipped detachable sensor 130 (e.g., by comparing changes in the position data of the object 160 over time from the camera 138 images).

The impingement module 330 may determine the predicted trajectory of the detected object 160 indirectly based on a classification of the detected object 160 and an associated predetermined characteristic of the detected object 160, as explained immediately below.

The database 350 is, for example, an electronic data structure stored in the memory 310 or another electronic data store and is configured with routines that can be executed by the processor(s) 300 for analyzing stored data, providing stored data, organizing stored data, and so on. Thus, in one embodiment, the database 350 stores data used/provided by the modules 320, 325, 330, 335, and 340 in executing various functions. The vehicle-equipped detachable sensors 130 can be operatively connected to the processor(s) 300, the database 350, the memory 310, and/or any other modules stored in the memory 310.

In one or more arrangements, the database 350 can include an object classification database 360. The object classification database 360 can include data corresponding to the classification of various objects. For example, the object classification database 360 can include data corresponding to features of various objects found in the environment around the non-automotive entity 140. Such features can be in the form of an image stored in the object classification database 360, a typical reading from the one or more vehicle-equipped detachable sensors 130 indicative of the particular type of object, and/or any other form of data useful for classifying objects. Examples of the various objects include, for example, vehicles, motorcycles, trees, pedestrians, bicyclists, animals, roadway signs, barricades, rivers, bridges, or any other objects typically found in the environment around the non-automotive entity 140.

Furthermore, the object classification database 360 may include specific characteristics regarding the type of object, for example, sedan, SUV, convertible, pick-up truck, mountain bicycle, racing bicycle, motocross motorcycle, street motorcycle, male or female pedestrian, large bear, brown bear, etc. The object classification database 360 may include object brand types, for example, Toyota vehicle, Lexus vehicle, Yamaha motorcycle, Kodiak bear, etc., and object model types, for example, Toyota Camry, Lexus IS, Yamaha Aerox 4, etc. The object classification database 360 may include any other level of detail that can distinctly classify the object.

Accordingly, the impingement module 330, in one embodiment, includes instructions to compare the features stored in the object classification database 360 to data captured from the vehicle-equipped detachable sensors 130. For example, an image of a bicycle stored on the object classification database 360 can be compared to images of the detected object 160 in the environment around the non-automotive entity 140 captured from, e.g., the camera 138. Such comparison can be performed by image processing software. The image processing software can be implemented by the impingement module 330. Responsive to the comparison of the bicycle being substantially the same as the detected object 160 in the environment around the non-automotive entity 140, the impingement module 330 can determine that the detected object 160 in the environment around the non-automotive entity 140 is a bicycle.

Additionally, or alternatively, the object classification database 360 can store data readings that are typical of the particular type of objects. For example, the object classification database 360 can store data from a typical LIDAR sensor reading indicative of a motocross motorcycle. Responsive to the comparison of the typical LIDAR sensor reading being substantially the same as the detected object 160 in the environment around the non-automotive entity 140 as detected by the LIDAR sensor 134, the impingement module 330 can determine that the detected object 160 in the environment around the non-automotive entity 140 is a motocross motorcycle. Although the previous two examples have been provided for purposes of clarity, any types of data can be stored on the object classification database 360 for comparison to data obtained via the vehicle-equipped detachable sensors 130. "Substantially the same" as mentioned above can be, for example, within one standard deviation, within half a standard deviation, within a quarter of a standard deviation, etc., or any other suitable method for determining similarities between images (from, e.g., the camera 138), reflective data (from, e.g., the radar sensors 132, the LIDAR sensors 134, the sonar sensors 136), etc. The determination of "substantially the same" may, for example, be different for comparisons between images than that of reflective type sensor data. As a result of the comparison, the detected objects 160 in the environment around the non-automotive entity 140 can be classified by the impingement module 330.

In one or more arrangements, the database 350 can further include a predetermined characteristics database 370. The predetermined characteristics database 370 can include one or more predetermined characteristics for various types of detected objects 160 that are classified. The predetermined characteristics can be indicative of tendencies particular objects have when moving. For example, the predetermined characteristics for a type of detected object 160, e.g., an ATV, can be top speed, more aggressive as compared to the predetermined characteristics for a standard street motorcycle, tend to have higher speeds on pavement as compared to gravel, tend to travel closer to moving objects as compared to vehicles, etc. It should be noted that the present disclosure is not limited to this example. In fact, any way of profiling various types of detected objects 160 can be used in the predetermined characteristics database 370. Additionally, different levels of profiling can be incorporated, including profiling based on the various classifications of the detected object 160, for example, type, brand, model, size, shape, color, gender, etc., and/or any other levels of profiling that could be used to differentiate tendencies of movement.

In either case, the impingement module 330, in one or more arrangements, can determine the current travel trajectory of the non-automotive entity 140, the predicted trajectory of the detected object 160 and other important factors, as set forth above, to ultimately determine whether the detected object 160 impinges upon the current travel trajectory of the non-automotive entity 140. The predicted trajectory of the detected object 160 may be based on any one of the predetermined characteristics for the detected object 160 that has been classified and the acquired data.

Figure 4:
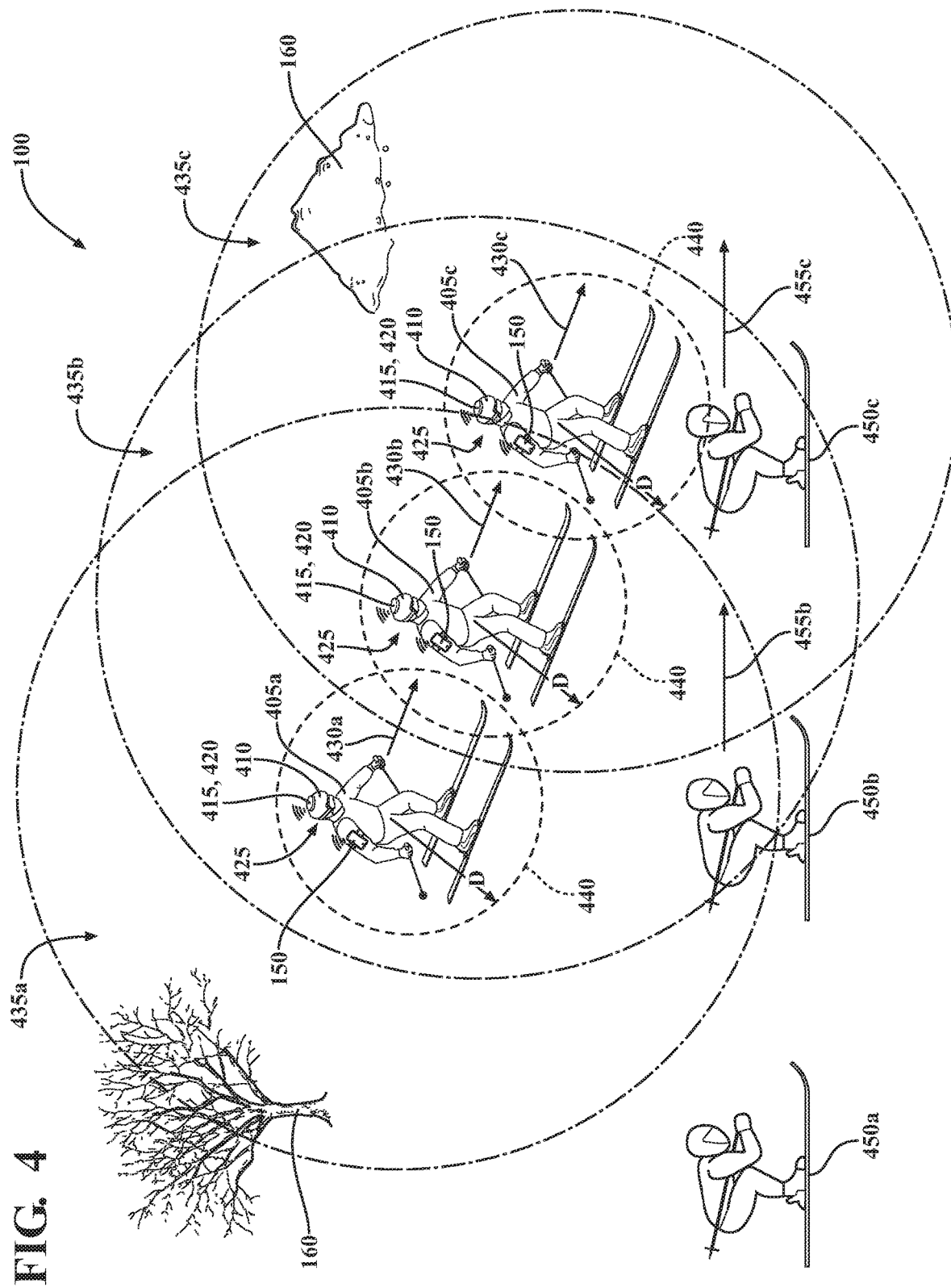
FIG. 4 is a perspective view of an example mobility system that determines a detected object impinges upon a current travel trajectory of the non-automotive entity.

As an example of how the impingement module 330 operates, FIG. 4 will now be discussed. FIG. 4 illustrates an example mobility system 100 where a non-automotive entity 405, e.g., 405a-405c, is shown skiing along a trail in three time lapsed scenes progressing from left to right and overlaid on top of each other. The non-automotive entity 405 is being rapidly approached by another skier. The non-automotive entity 405 has adapted a vehicle-equipped detachable sensor 415 as a wearable device and is wearing an intermediate device 410, e.g., a helmet, with the vehicle-equipped detachable sensor 415, in this case a lidar sensor 420, indirectly mounted to the wearable device user 405 via an intermediate mechanical link 425, e.g., a Velcro strap. The monitoring module 320 configures the lidar sensor 420 for object detection in any direction in an environment around the wearable device user 405. The wearable device user 405a-405c has a current travel trajectory 430, e.g., 430a-430c, respectively, as determined by the impingement module 330. The lidar sensor 420 has three time lapses scanning fields 435, e.g., 435a-435c that sense the environment around the wearable device user 405a-405c, respectively. As set forth above, a predetermined distance D is associated with the wearable device user 405. The predetermined distance D may be a distance value entered into the mobile device 150 by the wearable device user 405, as set forth above, and received by the impingement module 330. The predetermined distance D may correspond to a buffer zone 440, i.e., a three-dimensional sphere with radius D, around the wearable device user 405 where the wearable device user 405 would feel uncomfortable if an object were to penetrate the buffer zone 440.

With continued reference to FIG. 4, the lidar sensor 420 may detect moving objects, for example, the quickly approaching skier 450, e.g., 450a-450c. Specifically, the moving object 450b and 450c may be detected, for the moving object 450a is out of range of the lidar sensor 420 of the wearable device user 405a in the first scene. The moving objects 450b and 450c become the detected objects 450b and 450c. The lidar sensor 420 can detect the relative distance between the detected objects 450b and 450c and the wearable device user 405b and 405c, respectively, as well as the speed of the detected objects 450b and 450c. The lidar sensor 420 can also detect the stationary objects, e.g., the bush 160 and the snow pile 160. The impingement module 330 may classify the detected object 450 as a racing skier due to the type of skis and the tucked posture of the skier as determined from the comparison of the detected object 450 to the object classification database 360. The impingement module 330 can determine, using acquired data stored in the database 350, the speed of the wearable device user 405 and that the detected object 450 is traveling at a much faster speed relative to the wearable device user 405. In determining the predicted trajectory 455, e.g., 455b and 455c, of the detected object 450b and 450c, respectively, the impingement module 330 may base the determination on, for example, predetermined characteristics of the detected object 450 that has been classified (e.g., the racing skier and an associated aggressiveness factor associated with racing skier movement), the acquired data (e.g., the speed/acceleration and movement toward the wearable device user 405) and data received from the navigation unit of the mobile device 150 to predict the trajectories 455*b* and 455*c* of the detected objects 450*b* and 450*c*, respectively. The impingement module 330 may determine that the detected object 450 impinges upon the current travel trajectory 430 of the wearable device user 405. Specifically, the impingement module 330 may determine that the detected object 450*c* travels to within the predetermined distance D, i.e., within the buffer zone 440 of the wearable device user 405*c*, at the time of the third scene. In other words, the impingement module 330 may determine that there is not a potential collision, but determines that the detected object 450*c* comes within the predetermined distance D of the wearable device user 405*c* and penetrates the buffer zone 440. As described in detail below, the wearable device user 405 may be notified of the impingement via the mobile device 150, and the notification signal may vary depending upon the distance the detected object 450 is from the wearable device user 405. As shown in FIG. 4, the mobile device 150 is mounted to a right arm of the wearable device user 405

The notification module 335, in one embodiment, as set forth above, includes instructions that function to control the processor(s) 300 to output the notification signal to the mobile device 150 in response to determining the detected object 160 impinges upon the current travel trajectory of the non-automotive entity 140. More specifically, the notification module 335 controls the processor(s) 300 to direct the notification signal to the appropriate component of the output system 260 of the mobile device 150 for visual, audio and/or haptic perception by the operator 170 or the non-automotive entity 140, i.e., the wearable device user. The notification signal may have multiple components, e.g., a visual warning message including audio beeps, an audio warning message including haptic vibration information, etc. The notification signal may update the output system 260 periodically to signify that the non-automotive entity 140 is getting progressively closer to the detected object 160. For example, the period between audio beeps may increase, the haptic vibrations increase in duration, etc.

As set forth above, the output system 260 may include, e.g., a mobile display, mobile speakers, haptic vibration motors, a light emitting diode (LED) flash, etc.

Figure 5:
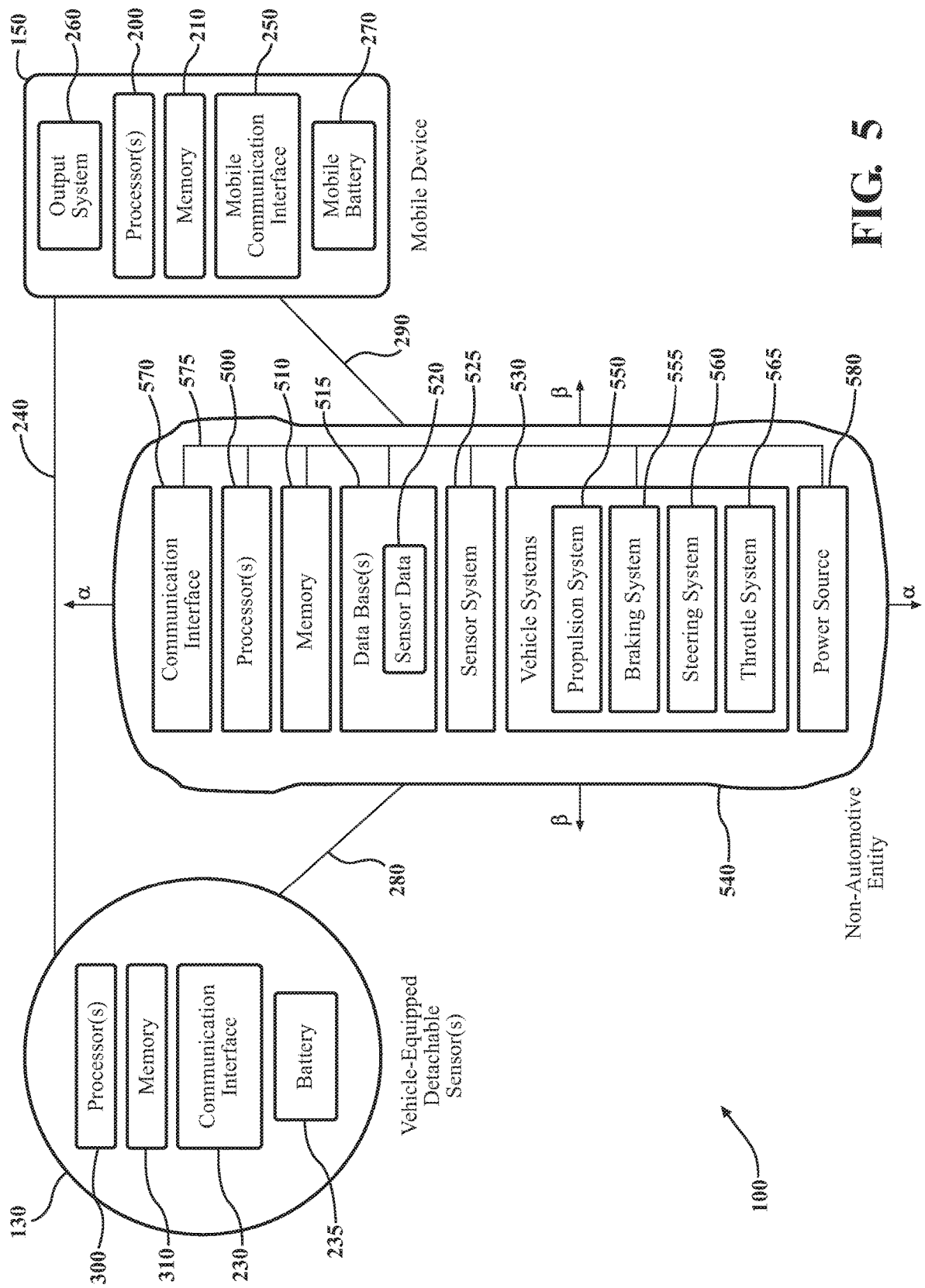
FIG. 5 is a block diagram illustrating an example mobility system that is capable of controlling one or more vehicle systems of the non-automotive entity to effect movement of the non-automotive entity.

Referring now to FIG. 5, a block diagram of an example mobility system 100 is shown that includes a non-automotive entity 540, the mobile device 150 and the vehicle-equipped detachable sensor 130 configured as a "smart sensor," i.e., contains the processor(s) 300. In one embodiment, the non-automotive entity 540 illustrated in FIG. 5 can be controlled by the mobility system 100. The non-automotive entity 540 can include various elements. Some of the possible elements of the non-automotive entity 540 are shown in FIG. 5 and will now be described. However, it should be understood that it is not necessary for the non-automotive entity 540 to include all of the elements shown in FIG. 5 or described herein. The non-automotive entity 540 can have any combination of the various elements shown in FIG. 5. Furthermore, the non-automotive entity 540 can have additional elements to those shown in FIG. 5. Further, while various elements are shown as being located within the non-automotive entity 540 in FIG. 5, it should be understood that one or more of these elements can be located external to the non-automotive entity 540. Further, the elements shown may be physically separated by large distances.

The non-automotive entity 540 can include one or more processors 500. The processor(s) 500 can be any component or group of components that are configured to execute any of the processes attributable to the operation of the non-automotive entity 540 or any form of instructions to carry out such processes or cause such processes to be performed.

The non-automotive entity 540 can include a memory 510. The memory 510 can include one or more forms of computer-readable media, and store instructions executable by the processor(s) 500 for performing various operations of the non-automotive entity 540. Examples of suitable memory 510 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

The processor(s) 300 and the memory 310 of the mobility system 100 may be completely contained within the vehicle-equipped detachable sensor 130, the mobile device 150, the non-automotive entity 540 or be distributed among the vehicle-equipped detachable sensor 130, the mobile device 150 and/or the non-automotive entity 540. The processor(s) 500 and the memory 510 may be a part of the mobility system 100, the mobility system 100 may include separate processor(s) and memory from the processors(s) 500 and the memory 510, or the mobility system 100 may access the processor(s) 500 and the memory 510 through a data bus or another communications path. As an example of a completely distributed mobility system 100, the vehicle-equipped detachable sensor 130 may include one of the processor(s) 300 and the memory 310 executing and storing the monitoring module 320, respectively, the mobile device 150 may include one of the processor(s) 300 and the memory 310 executing and storing the impingement module 330 and the notification module 335, respectively, and the non-automotive entity 540 may include one of the processor(s) 300 and the memory 310 executing and storing the control module 340, respectively.

In either case, in one or more arrangements of the mobility system 100, the vehicle-equipped detachable sensors 130 may include at least one of the one or more processors 300 and the memory 310, the mobile device 150 may include at least one of the one or more processors 300 and the memory 310 and the non-automotive entity 540 may include at least one of the one or more processors 300 and the memory 310. The processor(s) 200, the processor(s) 300 and the processor(s) 500 may be operatively connected to each other and may process any portion of the modules 320, 325, 330, 335, and 340 in any combination. The memory 210, the memory 310 and the memory 510 may be operatively connected to each other and may store any portion of the modules 320, 325, 330, 335, and 340 in any combination.

The non-automotive entity 540 can include one or more databases 515 for storing one or more types of data. The database(s) 515 can be a component of the memory 510, the processor(s) 500, or the database(s) 515 can be operatively connected to the processor(s) 500 and/or the memory 510 for use thereby. The database(s) 515 can include sensor data 520. In this context, "sensor data 520" means any information about the sensors that the non-automotive entity 540 is equipped with. As will be explained below, the non-automotive entity 540 can include a sensor system 525. The sensor data 520 can relate to one or more sensors of the sensor system 525. The database(s) 515 may be a part of the mobility system 100 and may store a portion of the database 350 of the mobility system 100, e.g., the object classification database 360, the predetermined characteristics database 370, etc.

The non-automotive entity 540 can include one or more modules, at least some of which are described herein. The modules can be implemented as computer-readable program code that, when executed by a processor, implement one or more of the various processes described herein. One or more of the modules can be a component of the processor(s) 500, or one or more of the modules can be executed on and/or distributed among other processing systems to which the processor(s) 500 is operatively connected. The modules can include instructions (e.g., program logic) executable by one or more processor(s) 500. Alternatively, or in addition, one or more databases 515 may contain such instructions.

The non-automotive entity 540 can also include a sensor system 525. The sensor system 525 can include one or more sensors. The one or more sensors can be configured to monitor something in the environment around the non-automotive entity 540. The one or more sensors can detect, determine, and/or sense information about the non-automotive entity 540 itself. The sensor system 525 can be positioned anywhere in or on the non-automotive entity 540. The one or more sensors can be configured to detect, and/or sense in real-time.

In arrangements in which the sensor system 525 includes a plurality of sensors, the sensors can work independently from each other. Alternatively, two or more of the sensors can work in combination with each other. In such case, the two or more sensors can form a sensor network. The sensor system 525 and/or the one or more sensors can be operatively connected to the processor(s) 500, the database(s) 515, and/or another element of the non-automotive entity 540. The sensor system 525 can acquire data of at least a portion of the external environment of the non-automotive entity 540.

The non-automotive entity 540 can include one or more vehicle systems 530 that effect movement of the non-automotive entity 540. Various examples of the one or more vehicle systems 530 that effect movement of the non-automotive entity 540 are shown in FIG. 5. However, the non-automotive entity 540 can include more, fewer, or different vehicle systems 530. It should be appreciated that although particular vehicle systems 530 are separately defined, each or any of the systems or portions thereof may be otherwise combined or segregated via hardware and/or software within the non-automotive entity 540. The non-automotive entity 540 can include, e.g., a propulsion system 550, a braking system 555, a steering system 560 and a throttle system 565. Each of these systems can include one or more devices, components, and/or combination thereof, now known or later developed.

The non-automotive entity 540 can include a communication interface 570. The communication interface 570 of the non-automotive entity 540 is implemented via an antenna, circuits, chips, or other electronic components that facilitate wired and/or wireless communication between the components of the mobile device 150 and the non-automotive entity 540 via the third link 290, as well as between the vehicle-equipped detachable sensor 130 and the non-automotive entity 540 via the one or more second links 280. The communication interface 570 may be programmed to communicate in accordance with any number of wired or wireless communication protocols. For instance, the communication interface 570 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, Wi-Fi, the Local Interconnect Network (LIN) protocol, the Universal Serial Bus (USB) protocol, etc.

The non-automotive entity 540 may be configured so that the components of the non-automotive entity 540 can communicate with each other using a controller area network (CAN) bus 575 or the like. Alternatively, any of the elements and/or systems described herein may be directly connected to each other without the use of a bus. Also, connections between the elements and/or systems described herein may be through another physical medium (such as wired connections), or the connections may be wireless connections.

The non-automotive entity 540 can include a power source 580. The power source 580 may provide power to one or more systems and/or subsystems of the non-automotive entity 540. The power source 580 may be, for example, a rechargeable battery (e.g., lithium ion, lead acid, etc.), a generator, etc. The power source 580 may be used to power the vehicle-equipped detachable sensors 130 via the one or more second links 280. Alternatively or additionally, the power source 580 of the non-automotive entity 540 may be used to recharge the battery 235 of the vehicle-equipped detachable sensor 130 via the second link 280.

With continued reference to FIG. 5, in one or more arrangements, the control module 340 includes instructions that function to control the processor(s) 300 to control one or more vehicle systems 530 to effect movement of the non-automotive entity 540 in response to determining that one or more of the detected objects 160 impinge upon the current travel trajectory of the non-automotive entity 540. As determined by the impingement module 330, the detected objects 160 may be moving with a predicted trajectory or the detected object 160 may be stationary. The impingement module 330 may communicate with the control module 340 when an impingement event is likely to occur, and/or the control module 340 may access the impingement module 330 in a periodic polling fashion to determine if an impingement event is likely to occur. For example, the impingement module 330 may determine that the detected object 160 impinges upon the non-automotive entity 140 in 5 seconds and broadcasts this impingement determination to the control module 340.

Depending on the physical location of the control module 340, i.e., the vehicle-equipped detachable sensor 130, the mobile device 150 and/or the non-automotive entity 540, the control module 340 may communicate with the processor(s) 500 by way of the communication interface 570 and/or the CAN bus 575. The control module 340 may be implemented when communication is established with the processor(s) 500 and the non-automotive entity 540 includes one or more vehicle systems 530 that effect movement, for example, FIG. 5 shows the non-automotive entity 540 including four vehicle systems 550, 555, 560, 565 that effect movement. The control module 340 may be able to interpret the acquired data received from the monitoring module 320 and non-automotive entity 540 data from the processor(s) 500, which may include the sensor data 520 from one or more sensors of the sensor system 525, to determine a control scheme to effect movement of the non-automotive entity 540. The control module 340 may further be able to determine control signals and communicate the control signals to the processor(s) 500 in order to effect movement of the non-automotive entity 540.

Accordingly, for the purpose of remedying the impingement, the control signals of the control module 340 may include information that when processed by the processor(s) 500 cause the non-automotive entity 540 to, for example, accelerate (e.g., by commanding the propulsion system 550 to increase the supply of fuel, and/or the throttle system 565 in increase speed), decelerate (e.g., by commanding the propulsion system 550 to decrease the supply of fuel, and/or the braking system 555 to apply the brakes), and/or change direction (e.g., by commanding the steering system 560 to turn the front two wheels). As used herein, "cause" or "causing" means to make, force, compel, direct, command, instruct, and/or enable an event or action to occur or at least be in a state where such event or action may occur, either in a direct or indirect manner.

The control module 340, in one or more arrangements, can determine which of the one or more vehicle systems 530 to control based on, e.g., how close the detected objects 160 are to the current travel trajectory of the non-automotive entity 540, the speed of the detected objects 160 and/or the speed of the non-automotive entity 540, the acceleration of the detected objects 160 and/or the acceleration of the non-automotive entity 540, the predicted trajectory of the type of detected object 160 classified in the environment around the non-automotive entity 540, the current travel trajectory of the non-automotive entity 540, etc. The control module 340 continues to provide the control signals to the processor(s) 500 until the impingement is removed. As stated above, the non-automotive entity 540 can include more, fewer, or different vehicle systems 530, and the basis for control module 340 engaging the vehicle systems 530 is not limited to the examples specified above.

Figure 6:
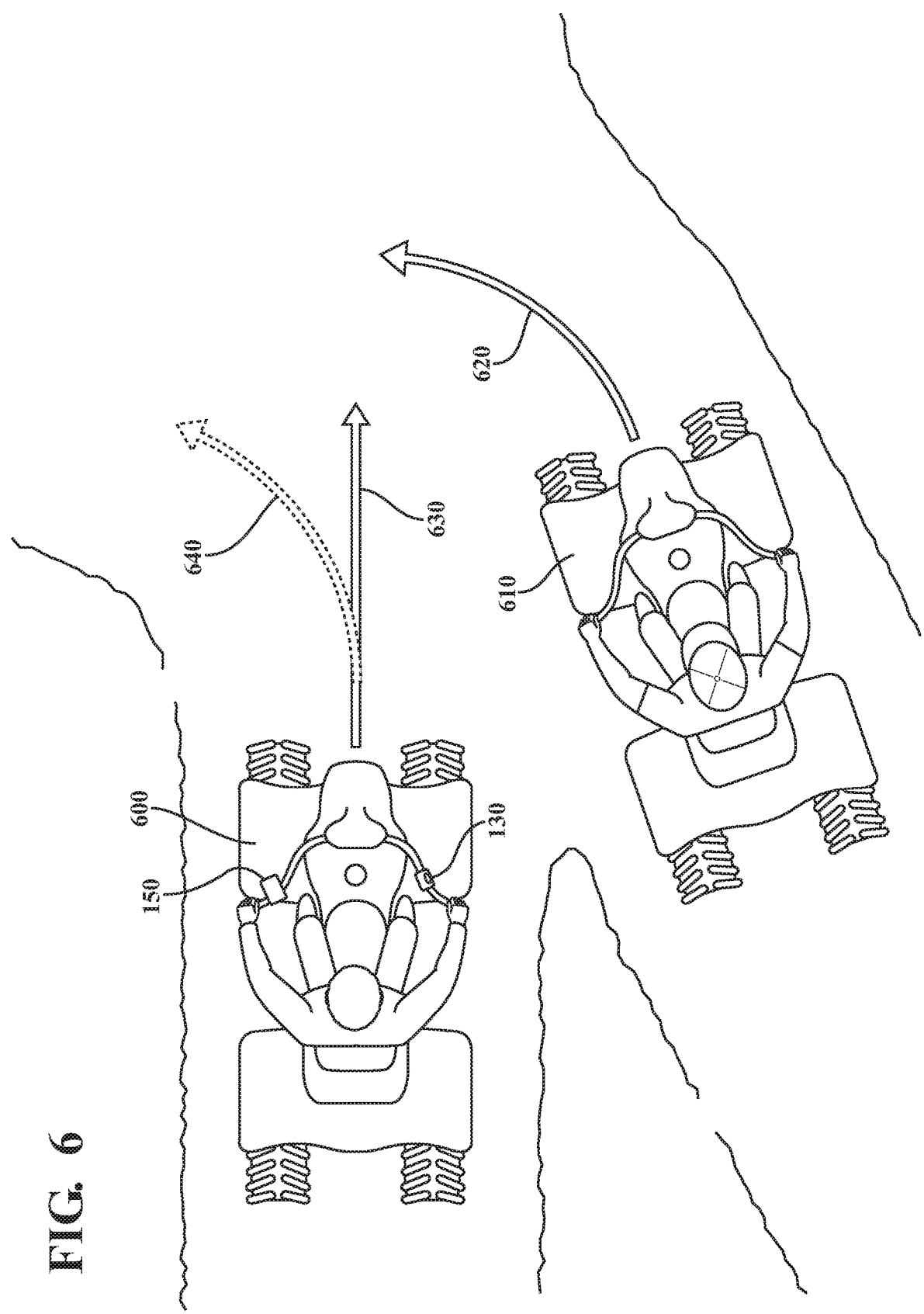
FIG. 6 is a top view of an example mobility system that determines a detected object impinges upon a current travel trajectory of the non-automotive entity, and as a result, controls movement of the non-automotive entity.

As an example of how the control module 340 operates, FIG. 6 will now be discussed. For example, FIG. 6 shows a non-automotive entity 600 and a detected object 610. The impingement module 330 can classify the detected object 610 as an ATV with a predicted trajectory 620. In determining the predicted trajectory 620 of the detected object 610, the impingement module 330 may consider, for example, any one of the predetermined characteristics of the detected object 610 that has been classified from the predetermined characteristics database 370, (e.g., percentage of aggressiveness for an ATV, top speed, etc.), acquired data (e.g., speed/acceleration of the detected object 610, location of the detected object 610 relative to the non-automotive entity 600, the distance between the non-automotive entity 600 and the detected object 610, the current direction of the detected object 610, etc.). The impingement module 330 can determine that the predicted trajectory 620 of the detected object 610 impinges upon, for example, comes with a predetermined distance of, a current travel trajectory 630 of the non-automotive entity 600 at a future time, e.g., 5 seconds. Once the impingement module 330 determines that the detected object 610 impinges upon the current travel trajectory 630 of the non-automotive entity 600, the control module 340 can access or receive this information from the impingement module 330 and communicate with the processor(s) 500 of the non-automotive entity 600 via the communication interface 570 and/or the CAN bus 575. The control module 340 can determine the control scheme that appropriately remedies the impingement and may communicate the control signals associated with the control scheme to the processor(s) 500 of the non-automotive entity 600 to effect movement. As set forth above, the control signals can include information that when processed by the processor(s) 500 may cause, for example, the braking system 555 to slow down the non-automotive entity 600, the propulsion system 550 to decrease the flow of fuel, the steering system 560 to turn the front wheels to change the current travel trajectory 630 to a new travel trajectory 640 of the non-automotive entity 600, etc. The control module 340 can determine which of the one or more vehicle systems 530 to effect based on the illustrated factors discussed above.

Figure 7:
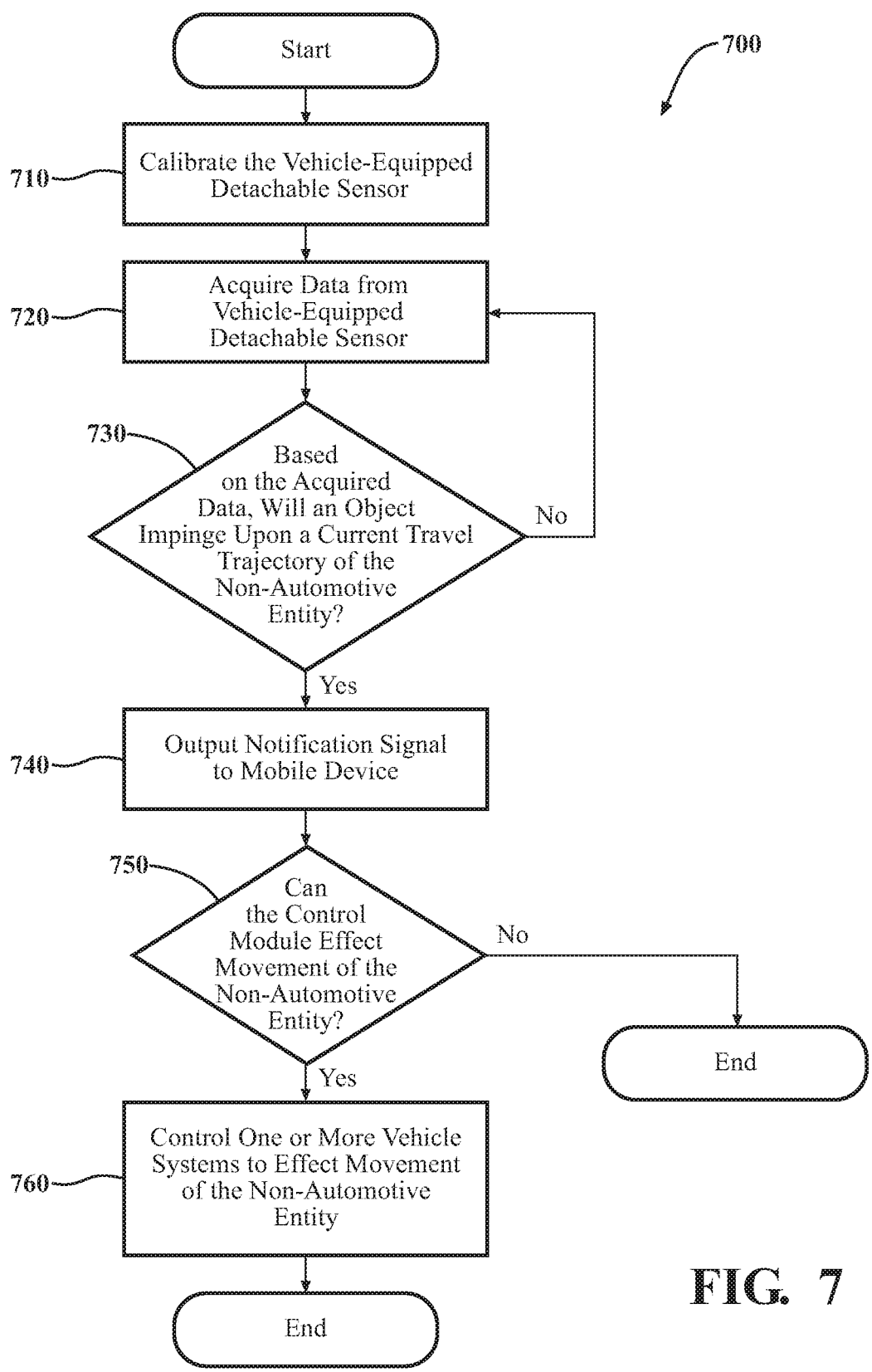
FIG. 7 is a flowchart illustrating one example of a method that is associated with extending the usage of the vehicle-equipped detachable sensor from an idle automotive vehicle to the non-automotive entity.

FIG. 7 illustrates a flowchart of a method 700 that is associated with extending the usage of the vehicle-equipped environmental sensors 120 from an idle automotive vehicle 110 to the non-automotive entity 140, 540. Method 700 will be discussed from the perspective of the mobility system 100 of FIGS. 1A-1C, 2-6, which includes non-automotive entities 140 illustrated in FIGS. 1A-1C, 2-4, and non-automotive entities 540 illustrated in FIG. 5. While method 700 is discussed in combination with the mobility system 100, it should be understood that the method 700 is not limited to being implemented within the mobility system 100, but is instead one example of a system that may implement the method 700. The steps that are illustrated herein as part of the method 700 are not limited to this particular chronological order. Indeed, some of the steps may be performed in a different order than what is shown and/or at least some of the steps shown can occur simultaneously.

As an initial matter, it should be noted that prior to acquiring sensor data at block 720 for the purpose of notification and/or control of the non-automotive entity 140, 540, the vehicle-equipped detachable sensor 130 may need to be calibrated to a mounting location on the non-automotive entity 140, 540. Thus, the described method 700, in one embodiment, includes a calibration step that is performed by block 710 that generally occurs before block 720. However, the calibration step of block 710 may occur in parallel to the method 700. For example, the vehicle-equipped detachable sensor 130 may need to be re-calibrated for whatever reason. Moreover, the calibration step of block 710 may not be necessary at all, as set forth above, and the method 700 starts at block 720.

At block 710, the calibration module 325, in one or more arrangements, may be accessed automatically when the vehicle-equipped detachable sensor 130 is detached and mounted to the non-automotive entity 140, 540. For example, the calibration module 325 is automatically accessed by the mobility system 100 when, e.g., the power to the vehicle-equipped detachable sensor 130 is removed and restored upon detachment and mounting, the calibration module 325 determines that a re-calibration is needed (e.g., the current calibration is outdated), etc. In other arrangements, the calibration module 325 may be accessed manually via, e.g., a calibration application running on the mobile device 150 that receives mounting location parameters from the operator 170, etc. In either case, once the calibration module 325 is initiated, the calibration module 325 can recall a previous calibration indexed in the memory 310. The calibration module 325 can determine if a new calibration is needed, e.g., the calibration is outdated, mounting location parameters have changed, no calibration exists, etc. If calibration is needed, the calibration module 325 can access data acquired by the monitoring module 320, request that the monitoring module 320 acquired new sensor data, and/or obtain mounting location parameters, as set forth above. Once the calibration module 325 is completed with the calibration, i.e., configuring the vehicle-equipped detachable sensor 130 to the mounting location on the non-automotive entity 140, 540, the calibration module 325 can index a new calibration and store the new calibration in the memory 310. The method 700 may then proceed to block 720.

At block 720, the monitoring module 320 acquires data from the vehicle-equipped detachable sensor 130 and stores the data in the database 350. In general, the monitoring module 320 continuously acquires data in order to continually update a perception of the surrounding environment around the non-automotive entity 140, 540 when the vehicle-equipped detachable sensor 130 is mounted to the non-automotive entity 140, 540. Thus, while the method 700 is discussed in a generally serial manner, it should be appreciated that the mobility system 100 can execute multiple iterations of the method 700 in order to maintain awareness of the surrounding environment. Moreover, because certain aspects of the acquired data are temporal in nature (e.g., tracking of moving objects), the monitoring module 320 can continuously acquire data and maintain the data as a temporal stream of data. Thus, the monitoring module 320 acquires data from the vehicle-equipped detachable sensor 130 and stores the data in the database 350 for future analysis. The monitoring module 320 configures the vehicle-equipped detachable sensor 130 to detect objects associated with the acquired data in the environment around the non-automotive entity 140, 540 when the vehicle-equipped detachable sensor 130 is mounted to the non-automotive entity 140, 540. The method 700 then proceeds to block 730.

At block 730, the impingement module 330 determines, based on the acquired data, whether the detected object 160 impinges upon the current travel trajectory of the non-automotive entity 140, 540. The impingement module 330 can accomplish this by determining that the predicted trajectory of the detected object 160 impinges, for example, come to within a predetermined distance of the non-automotive entity 140, 540 in, e.g., 5 seconds. The impingement module 330 can predict the trajectory of the detected object 160 indirectly from predetermined characteristics stored in the predetermined characteristics database 370, once it is classified, and/or directly from the acquired data. The impingement module 330 can classify the detected object 160 by comparing the detected object 160 to data stored in the object classification database 360. The impingement module 330 can determine the current travel trajectory of the non-automotive entity 140, 540 and determine whether the predicted trajectory of the object 160 impinges upon the current travel trajectory of the non-automotive entity 140, 540 based on the predicted trajectory of the detected object 160, the current travel trajectory of the non-automotive entity 140 and other factors, as set forth above. If the predicted trajectory of the detected object 160 or its stationary presence impinges upon the current travel trajectory of the non-automotive entity 140, 540, the method 700 proceeds to block 740. Otherwise, the method 700 proceeds to block 720 so that the monitoring module 320 may acquire more data from the vehicle-equipped detachable sensor 130.

At block 740, as a result of the impingement module 330 determining that the detected object 160 is impinging upon the current travel trajectory of the non-automotive entity 140, 540, the notification module 335 can output at least one notification signal to the mobile device 150. The mobile device 150 may receive the notification signal, decode the signal and direct the decoded information to the appropriate output system 260 of the mobile device 150. The method 700 then proceeds to block 750.

At block 750, the control module 340 attempts to communicate with the non-automotive entity 140, 540 via the communication interface 570 to determine if the non-automotive entity 140, 540 includes one or more vehicle systems 530 that effect movement of the non-automotive entity 140, 540. If the communication is successful, the non-automotive entity 540 can possibly be controlled by the control module 340 and the method 700 then proceeds to block 760.

Otherwise, the non-automotive entity 140 does not have the capability of being controlled, and the method 700 terminates.

At block 760, as a result of the impingement module 330 determining that the detected object 160 impinges upon the current travel trajectory of the non-automotive entity 540, the control module 340 can affect movement of the non-automotive entity 540 by communicating with the appropriate vehicle system 530 via the communication interface 570, or via the CAN bus 575 if the control module 340 is resident to the non-automotive entity 540. The control module 340 can affect movement of the non-automotive entity 540 by controlling the direction and/or the speed of the non-automotive entity 540 to remedy the impingement. The control module 340 can control one or more vehicle systems 530 based on various factors as set forth above. Once the impingement is removed, the method 700 then terminates.

Figure 8:
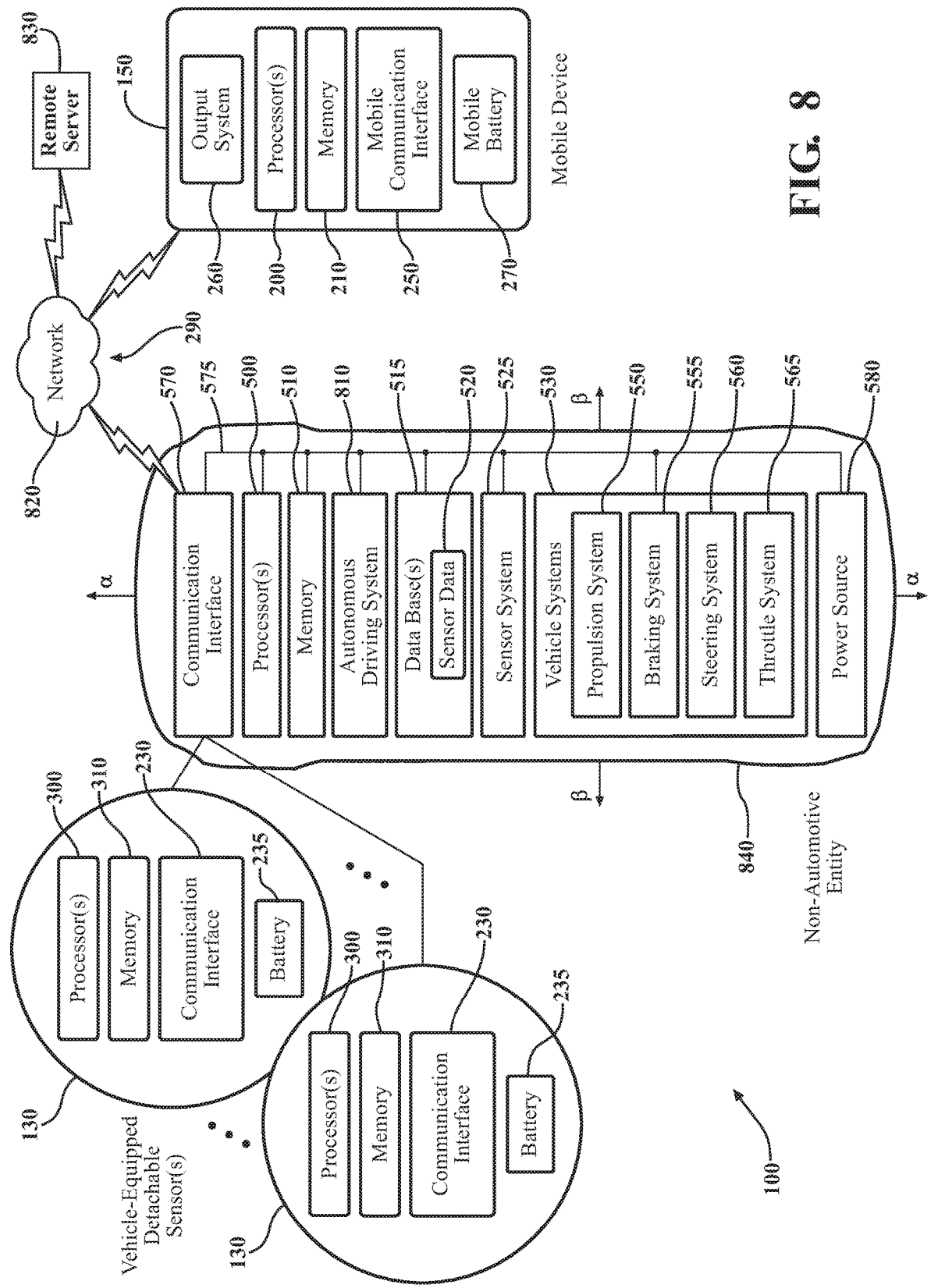
FIG. 8 is a block diagram illustrating other examples of how the mobility system affects movement of the non-automotive entity.

As further examples of how the mobility system can affect movement of the non-automotive entity, FIG. 8 will now be discussed. FIG. 8 illustrates a block diagram of an example mobility system 100 that includes a non-automotive entity 840 configured to operate fully or partially in an autonomous mode. More specifically, the non-automotive entity 840 may operate in autonomous mode without human intervention through receiving control instructions from an autonomous driving system 810. The intent of the example mobility system 100 of FIG. 8 is for the inclusion of one or more vehicle-equipped detachable sensors 130 for the purpose of enhancing the autonomous operation of the non-automotive entity 840. For example, the non-automotive entity 840 may be equipped with basic autonomous capabilities, for example, limited range sensors, limited maneuverable capability, limited classification abilities, etc. as compared to an autonomous version of the automotive vehicle 110.

The autonomous driving system 810 can be configured to determine travel path(s), current autonomous driving maneuvers for the non-automotive entity 840, future autonomous driving maneuvers and/or modifications to current autonomous driving maneuvers based on data from the sensors of the sensor system 525 and/or other systems of the non-automotive entity 840 (not shown) to enable safe navigation to an intended destination. "Driving maneuver" means one or more actions that affect the movement of the non-automotive entity 840. Examples of driving maneuvers include: accelerating, decelerating, braking, turning, moving in a lateral direction of the non-automotive entity 840, changing travel lanes, merging into a travel lane, and/or reversing, just to name a few possibilities.

The autonomous driving system may be enhanced by the addition of one or more vehicle-equipped detachable sensors 130 from the automotive vehicle 110. The control module 340 may communicate with the autonomous driving system 810 in the same manner as the processor(s) 500 as set forth above. In response to determining that one or more of the detected objects 160 impinge upon the current travel trajectory of the non-automotive entity 840, the control module 340 may communicate control signals from a control scheme determined by the control module 340 to the autonomous driving system 810. The autonomous driving system 810 may utilize the information within the control signal, i.e., the control scheme that affects movement of the non-automotive entity 840 as determined by the control module 340, to enhance the current and/or future autonomous driving maneuvers of the non-automotive entity 840. Alternatively or in addition, the autonomous driving system 810 may utilize the acquired data from the monitoring module 320 to enhance the current and/or future autonomous driving maneuvers.

With continuing reference to FIG. 8, the mobile device 150 may communicate with the communication interface 570 of the non-automotive entity 840 remotely via the third link 290 and the third link 290 may include a network 820. As described above, one or more of the modules 320, 325, 330, 335 and 340 of the mobility system 100 may be stored in the memory 210 and executed by the processor(s) 200 of the mobile device 150. In one arrangement, the mobile device 150 may include the monitoring module 320 and the vehicle-equipped detachable sensors 130 can be configured to communicate with the mobile device 150 through the non-automotive entity 840. For example, the mobile device 150 may acquire data from the vehicle-equipped detachable sensors 130 that are configured to transmit data through a gateway facilitated by the communication interface 570 of the non-automotive entity 840.

The network 820 represents one or more mechanisms by which the non-automotive entity 840 and the mobile device 150 may communicate with each other. The network 820 may include one or more known networks and/or networking technologies, such as wireless communication networks (e.g., Bluetooth, IEEE 802.11, etc.), a cellular network, local area networks (LAN) and/or wide area networks (WAN), including the Internet, providing data communication services.

The one or more modules 320, 325, 330, 335, 340 of the mobility system 100 may be stored and executed by a remote server 830. The remote server 830 may communicate with the communication interface 570 of the non-automotive entity 840 via the third link that includes the network 820. The remote server 830 is a computer including a processor and a memory, the memory stores instructions which may be executed by the processor.

Alternatively, the non-automotive entity 840 of FIG. 8 may not include the autonomous driving system 810, but the non-automotive entity 840 may be "autonomous capable." In one arrangement, "autonomously capable" means that processor(s) 500 and the vehicle systems 530 of the non-automotive entity 840 may be able to perform autonomous driving functions, but lack some of the sensors used to perform autonomous driving functions as well as sufficient processing capabilities needed for autonomous driving calculations. In this case, one or more of the vehicle-equipped detachable sensors 130, as shown in FIG. 8, may provide the autonomous driving sensor functionality. Furthermore, an intermediate processing module (not shown) may communicate with the processor(s) 500 directly via the CAN bus 575, e.g., by a data port on the non-automotive entity 840, or wirelessly through the communications interface 570 to provide the necessary computation capabilities to enable autonomous driving functionality. The intermediate processing module may communicate with the monitoring module 320 to receive data acquired from the vehicle-equipped detachable sensors 130 to assist in the autonomous driving operation. The intermediate processing module may communicate with the control module 340 in the same fashion as the autonomous driving system 810 to enhance autonomous operation offered by mobility system 100. The intermediate processing module may reside on the remote server 830 or the mobile device 150, for example, as an application running on the mobile device 150.

The autonomous movement of the non-automotive entity 840 may be remotely monitored by the remote server 830 and/or the mobile device 150, e.g., by a monitoring application running on the mobile device 150.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-1C, 2-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A mobility system comprising:
a vehicle-equipped detachable sensor capable of sensing a portion of an environment around an automotive vehicle and configured to communicate with a mobile device, the vehicle-equipped detachable sensor structured to be detached from the automotive vehicle and mounted to a non-automotive entity;
one or more processors;
a memory communicably coupled to the one or more processors and storing:
a monitoring module including instructions that when executed by the one or more processors cause the one or more processors to acquire data from the vehicle-equipped detachable sensor about one or more objects in an environment around the non-automotive entity when the vehicle-equipped detachable sensor is mounted to the non-automotive entity;
an impingement module including instructions that when executed by the one or more processors cause the one or more processors to determine, based on the acquired data, whether a detected object of the one or more objects impinges upon a current travel trajectory of the non-automotive entity; and
a notification module including instructions that when executed by the one or more processors cause the one or more processors to, in response to determining the detected object impinges upon the current travel trajectory of the non-automotive entity, output at least one notification signal to the mobile device.

2. The mobility system of claim 1, wherein the vehicle-equipped detachable sensor includes at least one of the one or more processors and the memory.

3. The mobility system of claim 1, wherein the vehicle-equipped detachable sensor is configured to wirelessly communicate with the mobile device.

4. The mobility system of claim 1, wherein the vehicle-equipped detachable sensor is configured to communicate with the mobile device through the non-automotive entity.

5. The mobility system of claim 1, further comprising a calibration module, the calibration module including instructions that when executed by the one or more processors cause the one or more processors to calibrate the vehicle-equipped detachable sensor to a portion of the environment around the non-automotive entity based at least in part on mounting location parameters associated with a mounting location of the vehicle-equipped detachable sensor on the non-automotive entity.

6. The mobility system of claim 1, further comprising a control module, the control module including instructions that when executed by the one or more processors cause the one or more processors to, in response to determining the detected object impinges upon the current travel trajectory of the non-automotive entity, control one or more vehicle systems of the non-automotive entity to effect movement of the non-automotive entity.

7. The mobility system of claim 1, wherein the impingement module further includes instructions to determine a predicted trajectory of the detected object based at least in part on one or more of a classification of the detected object and the acquired data.

8. The mobility system of claim 1, wherein the impingement module further includes instructions to, in determining whether the detected object impinges upon the current travel trajectory of the non-automotive entity, determine whether the detected object and the non-automotive entity come within a predetermined distance from one another.

9. The mobility system of claim 1, wherein the mobile device includes at least one of the one or more processors and the memory, and the non-automotive entity includes at least one of the one or more processors and the memory.

10. The mobility system of claim 1, wherein the vehicle-equipped detachable sensor includes a battery.

11. A method comprising:
acquiring data from a vehicle-equipped detachable sensor about one or more objects in an environment around a non-automotive entity when the vehicle-equipped detachable sensor is mounted to the non-automotive entity, the vehicle-equipped detachable sensor capable of sensing a portion of an environment around an automotive vehicle and configured to communicate with a mobile device, the vehicle-equipped detachable sensor structured to be detached from the automotive vehicle and mounted to the non-automotive entity;

determining, based on the acquired data, whether a detected object impinges upon a current travel trajectory of the non-automotive entity; and in response to determining the detected object impinges upon the current travel trajectory of the non-automotive entity, outputting at least one notification signal to the mobile device.

12. The method of claim 11, further comprising:

calibrating the vehicle-equipped detachable sensor to a portion of the environment around the non-automotive entity based at least in part on mounting location parameters associated with a mounting location of the vehicle-equipped detachable sensor on the non-automotive entity.

13. The method of claim 11, further comprising:

in response to determining the detected object impinges upon the current travel trajectory of the non-automotive entity, controlling one or more vehicle systems of the non-automotive entity to effect movement of the non-automotive entity.

14. The method of claim 11, further comprising:

determining a predicted trajectory of the detected object based at least in part on one or more of a classification of the detected object and the acquired data.

15. The method of claim 11, further comprising:

in determining whether the detected object impinges upon the current travel trajectory of the non-automotive entity, determining whether the detected object and the non-automotive entity come within a predetermined distance from one another.

16. A non-transitory computer-readable medium and storing instructions that when executed by one or more processors cause the one or more processor to:

acquire data from a vehicle-equipped detachable sensor about one or more objects in an environment around a non-automotive entity when the vehicle-equipped detachable sensor is mounted to the non-automotive entity, the vehicle-equipped detachable sensor capable of sensing a portion of an environment around an automotive vehicle and configured to communicate with a mobile device, the vehicle-equipped detachable sensor structured to be detached from the automotive vehicle and mounted to the non-automotive entity;

determine, based on the acquired data, whether a detected object impinges upon a current travel trajectory of the non-automotive entity; and in response to determining the detected object impinges upon the current travel trajectory of the non-automotive entity, output at least one notification signal to the mobile device.

17. The non-transitory computer-readable medium of claim 16, wherein the computer-readable medium further includes instructions that when executed by the one or more processors cause the one or more processors to:

calibrate the vehicle-equipped detachable sensor to a portion of the environment around the non-automotive entity based at least in part on mounting location parameters associated with a mounting location of the vehicle-equipped detachable sensor on the non-automotive entity.

18. The non-transitory computer-readable medium of claim 16, wherein the computer-readable medium further includes instructions that when executed by the one or more processors cause the one or more processors to:

in response to determining the detected object impinges upon the current travel trajectory of the non-automotive entity, control one or more vehicle systems of the non-automotive entity to effect movement of the non-automotive entity.

19. The non-transitory computer-readable medium of claim 16, wherein the computer-readable medium further includes instructions that when executed by the one or more processors cause the one or more processors to:

determine a predicted trajectory of the detected object based at least in part on one or more of a classification of the detected object and the acquired data.

20. The non-transitory computer-readable medium of claim 16, wherein the computer-readable medium further includes instructions that when executed by the one or more processors cause the one or more processors to:

in determining whether the detected object impinges upon the current travel trajectory of the non-automotive entity, determine whether the detected object and the non-automotive entity come within a predetermined distance from one another.

* * * * *